US006190426B1

(12) United States Patent
Thibault et al.

(10) Patent No.: US 6,190,426 B1
(45) Date of Patent: Feb. 20, 2001

(54) METHODS OF PREPARING PRISMATIC CELLS

(75) Inventors: William C. Thibault, Vail; Eric V. Kanto, Tucson; Yordan M. Gernov, Tucson; Christopher S. Dodds, Tucson; Terje A. Skotheim, Tucson, all of AZ (US)

(73) Assignee: Moltech Corporation, Tucson, AZ (US)

( * ) Notice: Under 35 U.S.C. 154(b), the term of this patent shall be extended for 0 days.

(21) Appl. No.: 09/215,030

(22) Filed: Dec. 17, 1998

(51) Int. Cl.[7] .................................................... H01M 10/38

(52) U.S. Cl. ...................... 29/623.2; 29/623.1; 29/623.4; 429/94

(58) Field of Search ............................... 29/623.1, 623.2, 29/623.4; 429/94

(56) References Cited

U.S. PATENT DOCUMENTS

| | | |
|---|---|---|
| 4,143,214 | 3/1979 | Chang et al. . |
| 4,152,491 | 5/1979 | Chang et al. . |
| 4,664,991 | 5/1987 | Perichaud et al. . |
| 4,709,472 | 12/1987 | Machida et al. . |
| 4,723,347 | 2/1988 | Burzi et al. . |
| 4,739,018 | 4/1988 | Armand et al. . |
| 4,833,048 | 5/1989 | De Jonghe et al. . |
| 4,917,974 | 4/1990 | De Jonghe et al. . |
| 4,997,732 | 3/1991 | Austin et al. . |
| 5,162,175 | 11/1992 | Visco et al. . |
| 5,324,599 | 6/1994 | Oyama et al. . |
| 5,415,954 | 5/1995 | Gauthier et al. . |
| 5,439,760 | 8/1995 | Howard et al. . |
| 5,441,831 | 8/1995 | Okamoto et al. . |
| 5,478,668 | 12/1995 | Gozdz et al. . |
| 5,516,598 | 5/1996 | Visco et al. . |
| 5,529,860 | 6/1996 | Skotheim et al. . |
| 5,538,812 | 7/1996 | Lee et al. . |
| 5,549,717 | 8/1996 | Takeuchi et al. . |
| 5,597,659 | 1/1997 | Morigaki et al. . |
| 5,601,947 | 2/1997 | Skotheim et al. . |
| 5,603,737 | 2/1997 | Marincic et al. . |
| 5,658,683 | 8/1997 | Kageyama et al. . |
| 5,690,702 | 11/1997 | Skotheim et al. . |
| 5,691,005 | 11/1997 | Morigaki et al. . |
| 5,700,299 | 12/1997 | Clark . |

FOREIGN PATENT DOCUMENTS

| | | |
|---|---|---|
| 851522 A2 | 7/1998 | (EP) . |
| 2324404 | 10/1998 | (GB) . |
| 60-25164 | 2/1985 | (JP) . |
| 60-56376 | 4/1985 | (JP) . |

*Primary Examiner*—John S. Maples
(74) *Attorney, Agent, or Firm*—Morrison & Foerster LLP

(57) ABSTRACT

The present invention pertains to methods of preparing prismatic cells which comprise the steps of winding lithium metal anode, separator, and cathode layers on a rounded mandrel having a large circumference relative to the external dimensions of the prismatic cell stack and of compressing the multilayer rounded cell stack into a prismatic shape and then filling the prismatic subassembly with electrolyte to form a prismatic ell stack, or alternatively of winding into such a rounded cell stack and filling with electrolyte and then compressing into a prismatic cell stack, prior to enclosing the prismatic cell stack in a barrier material film and sealing to form the casing of the prismatic cell. The present invention also pertains to electric current producing cells prepared according to such methods.

103 Claims, 8 Drawing Sheets

METHODS OF PREPARING PRISMATIC CELLS

TECHNICAL FIELD

The present invention relates generally to the field of electric current producing cells having a prismatic shape. More particularly, the present invention pertains to methods of preparing prismatic cells, which methods comprise the steps of winding the layers of the prismatic cell on a rounded mandrel having a large circumference relative to the dimensions of the cell to form a rounded multilayer subassembly and of pressing the rounded subassembly into a prismatic shape and then filling the prismatic subassembly with electrolyte to form a prismatic cell stack, or alternatively of winding to form the rounded multilayer subassembly, filling with electrolyte, and then pressing to form a prismatic cell stack, followed by enclosing the prismatic cell stack in a barrier material film and sealing to form the casing of the prismatic cell. The present invention also pertains to electric current producing cells prepared according to such methods.

BACKGROUND

Throughout this application, various publications, patents, and published patent applications are referred to by an identifying citation. The disclosures of the publications, patents, and published patent applications referenced in this application are hereby incorporated by reference into the present disclosure to more filly describe the state of the art to which this invention pertains.

There has been considerable interest in recent years in developing high energy density cathode active materials and alkali metals as anode active materials for high energy primary and secondary batteries. As the evolution of batteries to higher gravimetric and volumetric capacities and smaller sizes continues, there is increased interest in batteries of non-cylindrical shapes, particularly batteries with prismatic shapes or at least two substantially parallel flat sides. When the prismatic cells in these batteries utilize a liquid electrolyte, this electrolyte is commonly added to the prismatic cell after the assembled electrode stack has been placed in an enclosure, such as a flexible bag or a rigid metal casing, and sealed except for a small opening through which the liquid electrolyte is introduced. After the liquid electrolyte has been filled into the bag or metal casing, the small opening of the fill port is then sealed to completely seal the cell, as, for example, described in U.S. Pat. No. 5,439,760 to Howard et al. and U.S. Pat. No. 5,549,717 to Takeuchi et al., and in European Pat. Application No. 851,522 A2 to Inuzuka et al.

This general method of making prismatic cells that utilize liquid electrolytes may be adequate for some battery product designs and electrochemical chemistries such as, for example, some electroactive transition metal oxide cathode active materials that undergo a intercalation with lithium ions during their electrochemistry and are highly porous in combination with liquid-permeable or porous current collector substrates for the cathode which promote the penetration and filling of the cell by the liquid electrolyte. For example, U.S. Pat. No. 5,478,668 to Gozdz et al. describes prismatic cells where one of the current collector foils of the cell has an open grid and is permeable to allow penetration of electrolyte solution into the cell layer. However, penetration of the electrolyte solution into the cell layers may not be effective when the porous areas of the separator and of the cathode active layer are difficult to fill with the liquid electrolyte such as, for example, may occur with very dense cathode active layers or with non-permeable substrates or current collectors for the anode and the cathode. Also, it may not be effective when excess amounts of liquid electrolyte are introduced into the cell and add undesired weight and further produce undesired loss of soluble cathode active materials from the cathode active layer such as, for example, are formed in the oxidation-reduction electrochemistry of many sulfur-containing cathode active materials. Further, it may not be effective as the anode, cathode, separator and other layers of the prismatic cell become thinner and produce more layers and a greater surface area in each prismatic cell that requires filling with the electrolyte.

In the preparation of prismatic cells utilizing the general process of preparing the electrode stack in a prismatic shape, enclosing the electrode stack in a barrier material film and sealing except for a small opening through which to fill the sealed bag with liquid electrolyte, filling with the electrolyte, and then completing the sealing of the bag, it is known to wind the anode, separator, and cathode layers of the electrode stack of the cell on a mandrel of some type and then press the electrode stack into a prismatic shape. Subsequently, the pressed electrode stack is sealed in the bag or rigid casing material and then the liquid electrolyte is introduced into the sealed bag or rigid casing. A variety of shapes, including flat, rounded, and rhombic shapes, have been utilized for the mandrel to wind the electrode stack before pressing into the prismatic shape. For example, U.S. Pat. No. 5,439,760 to Howard et al. discloses the use of elongated, very thin, and flat mandrels for winding into prismatic cells. U.S. Pat. No. 5,603,737 to Marincic et al. describes conventional methods of preparing rectangular-shaped or prismatic cells, such as stacks of individual electrode layers, a zig-zag configuration of electrode layers, and a folded configuration of electrode layers. The '737 patent discloses a thin flat mandrel for winding electrode layers for mounting within a rectangular-shaped housing of a cell. U.S. Pat. No. 5,549,717 to Takeuchi et al. describes the use of a flat mandrel of rectangular cross-section to prepare prismatic cells. Also, for example, U.S. Pat. No. 5,658,683 to Kageyama et al. describes winding around a core which has a rhombic sectional shape, compressing to form a multilayered roll having an ellipsoidal sectional shape, placing the roll in a casing, and filling the casing with a non-aqueous electrolyte. The '683 patent is directed to applying the multilayer roll to a rectangular box-shaped or prismatic-shaped cell and states that the general method of winding the multilayer roll around a core having a circular or ellipsoid shape in section produces undesirable winding looseness between the electrode layers which leads to reduced and less uniform discharge capacity in the cell. The diameter or circumference of these mandrels relative to the desired dimensions of the prismatic cell have not been specified. As prismatic cells utilize thinner cathode, separator, and anode layers and consequently contain more total layers and a greater surface area of layers, often with more fragile, thinner layers that need protection from mechanical stresses during fabrication of the cells, suitable mandrel shapes and circumferences need to be established for effectively obtaining consistent results in the preparation of prismatic cells.

Despite the various approaches proposed for the methods of preparing high energy density prismatic cells, there remains a need for improved methods, which provide a combination of excellent filling by the electrolyte and high electrochemical utilization of the cathode active material together with consistent product performance while reducing the amount of excess electrolyte introduced into the prismatic cell and also reducing the mechanical stresses that may damage the multilayers of the prismatic cell.

SUMMARY OF THE INVENTION

One aspect of the present invention pertains to a method comprising a winding-pressing-filling-sealing sequence to prepare a multilayer electric current producing cell having a casing and a prismatic cell stack, the prismatic cell stack having an external length dimension, an external width dimension, an external thickness dimension, two substantially parallel flat sides, and outside permeable surfaces; which method comprises, in order, the steps of: (a) providing a combination of (i) an anode comprising an anode active layer, which layer comprises an anode active material comprising lithium, (ii) a solid composite cathode comprising a cathode active layer, which layer comprises a cathode active material, the cathode active layer having a first surface and a second opposite surface, said solid composite cathode further comprising a non-permeable current collector in contact with the first surface of the cathode active layer, and (iii) a separator interposed between the anode active layer and the solid composite cathode, and in contact with the second surface of the cathode active layer, wherein the anode active layer and the cathode active layer are positioned in a face-to-face relationship; (b) winding the combination on a mandrel having a cross-section of a rounded shape and having a circumference selected from the lengths consisting of: (i) 140 to 200 per cent of the difference between the external length dimension and the external thickness dimension of the prismatic cell stack, and (ii) 140 to 200 per cent of the difference between the external width dimension and the external thickness dimension of the prismatic cell stack; such winding forming a rounded anode-separator-solid composite cathode subassembly having a jellyroll configuration and a rounded shape; (c) removing the mandrel from the rounded subassembly; (d) compressing the rounded subassembly in a press to form a prismatic subassembly having two substantially parallel flat surfaces; (e) removing the prismatic subassembly from the press; (f) contacting the prismatic subassembly to a source of a liquid nonaqueous lithium salt electrolyte to form a prismatic cell stack, wherein the electrolyte substantially fills porous areas within the prismatic cell stack; (g) removing the prismatic cell stack from contact with the source of the electrolyte; (h) enclosing the prismatic cell stack in a barrier material film; and, (i) sealing the film to form the casing. In one embodiment, after step (c) and prior to step (d), the rounded subassembly is shaped into a form that is intermediate between the rounded shape resulting from step (c) and a prismatic shape having two substantially parallel flat surfaces. Preferably, the intermediate form comprises a prefolded edge.

In one embodiment of the methods of a winding-pressing-filling-sealing sequence of this invention, the rounded shape in step (b) is a circle. In another embodiment, the rounded shape in step (b) is an ellipse. In one embodiment, the circumference of the rounded shape is selected from the group consisting of: (i) 150 to 195 per cent of the difference between the external length dimension and the external thickness dimension of the prismatic cell stack and, preferably, the circumference is in the range of 160 to 190 per cent of the difference; and (ii) 150 to 195 per cent of the difference between the external width dimension and the external thickness dimension of the prismatic cell stack and, preferably, the circumference is in the range of 160 to 190 per cent of the difference.

In one embodiment of the methods of a winding-pressing-filling-sealing sequence of the present invention, prior to step (b), one or more anode tabs are attached to the anode and one or more cathode tabs are attached to the current collector of the solid composite cathode; and, preferably, after step (c) and prior to step (d), the rounded subassembly is shaped into a form that is intermediate between the rounded shape resulting from step (c) and a prismatic shape having two substantially parallel flat surfaces. More preferably, the intermediate form comprises a prefolded edge.

In one embodiment of the methods of a winding-pressing-filling-sealing sequence of this invention, after step (c) and prior to step (d), one or more anode tabs are attached to the anode and one or more cathode tabs are attached to the current collector of the solid composite cathode. In another embodiment, after step (e) and prior to step (f), one or more anode tabs are attached to the anode and one or more cathode tabs are attached to the current collector of the solid composite cathode.

In one embodiment of the methods of a winding-pressing-filling-sealing sequence of the present invention, the one or more anode tabs and the one or more cathode tabs extend from the prismatic cell stack and through the casing in an electrically insulated relationship with respect to each other and to the casing.

In one embodiment of the methods of a winding-pressing-filling-sealing sequence of the present invention, the anode active layer comprises a lithium metal layer. In one embodiment of the method, the edge of the lithium metal layer extends beyond the corresponding edges of the solid composite cathode and the separator to form a lithium metal extension, and substantially all of the lithium metal extensions are placed in electrical contact by ultrasonic welding.

In one embodiment of the methods of a winding-pressing-filling-sealing sequence of this invention, the anode comprises an anode active layer comprising lithium further comprises a non-permeable current collector. In one embodiment, prior to step (b), one or more anode tabs are attached to the non-permeable current collector of the anode and one or more cathode tabs are attached to the current collector of the solid composite cathode.

In another embodiment of the methods of a winding-pressing-filling-sealing sequence of the present invention, the non-permeable current collector of the anode comprises a conductive layer having a first surface and an opposite second surface, said first surface being in contact with the anode active layer, wherein the conductive layer is selected from the group consisting of: conductive metals, coatings comprising conductive metal pigments, coatings comprising conductive carbons, coatings comprising conductive graphites, and coatings comprising conductive metal oxide pigments. Preferably, the second surface of the conductive layer is in contact with an insulating layer. In one embodiment, an edge of the conductive layer of the non-permeable current collector of the anode provides a plurality of anode contact edges for the multilayer cell, and a metallic layer is deposited in electrical contact with the conductive layers at substantially all of the anode contact edges, and, preferably, the edge of the conductive layer of the non-permeable current collector of the anode extends beyond the corresponding edges of the solid composite cathode, the separator, and the anode active layer. In a preferred embodiment, the metallic layer is deposited by metal spraying. In one embodiment, the metallic layer comprises a metal selected from the group consisting of: copper and nickel. Preferably, the conductive layer of the non-permeable current collector of the anode comprises copper and the insulating layer of the non-permeable current collector of the anode is selected from the group consisting of: plastic films and polymeric coatings.

In one embodiment of the methods of a winding-pressing-filling-sealing sequence of this invention, the non-permeable current collector of the solid composite cathode is selected from the group consisting of: conductive metal foils and conductive metal layers on an insulating layer. Preferably, the conductive metal of the non-permeable current collector of the solid composite cathode comprises aluminum and the insulating layer of the non-permeable current collector of the solid composite cathode is selected from the group consisting of: plastic films and polymeric coatings. In one embodiment, a conductive layer is interposed between the cathode active layer and the non-permeable current collector of the solid composite cathode, and the conductive layer is selected from the group consisting of: coatings comprising conductive metal pigments, coatings comprising conductive carbons, coatings comprising conductive graphites, and coatings comprising conductive metal oxide pigments.

In one embodiment of the methods of a winding-pressing-filling-sealing sequence of the present invention, an edge of the conductive metal foil of the current collector of the solid composite cathode extends beyond the corresponding edges of the anode and the separator to form a conductive metal foil extension and wherein substantially all of the conductive metal foil extensions are placed in electrical contact by ultrasonic welding.

In another embodiment of the methods of a winding-pressing-filling-sealing sequence of this invention, an edge of the current collector of the solid composite cathode provides a plurality of cathode contact edges for the multilayer cell. In one embodiment, a metallic layer is deposited in electrical contact with the current collector of the solid composite cathode at substantially all of the cathode contact edges, and, preferably the edge of the current collector of the solid composite cathode extends beyond the corresponding edges of the cathode active layer, the separator, and the anode. In a preferred embodiment, the metal is deposited by metal spraying. In one embodiment, the metallic layer comprises a metal selected from the group consisting of: aluminum, nickel, silver, tin and stainless steel.

In another embodiment, the insulating layer of the current collector of the anode and the insulating layer of the current collector of the solid composite cathode are positioned in a face-to-face relationship, and, preferably, the insulating layers in the face-to-face relationship are adhered to each other. In one embodiment, the insulating layers in the face-to-face relationship are adhered to each other by the application of heat, and, preferably the heat is applied during step (b) or during step (d). In another embodiment, prior to step (b), the insulating layers in the face-to-face relationship are adhered to each other by application of an adhesive to one or both of the insulating layers.

In one embodiment of the methods of a winding-pressing-filling-sealing sequence of this invention, after step (g) and prior to step (h), the outside permeable surfaces of the prismatic cell stack are encapsulated to form a non-permeable prismatic cell stack. Preferably, this encapsulation is done by immersing the outside permeable surfaces of the prismatic cell stack in a liquid comprising an encapsulating resin, removing the prismatic cell stack from the liquid, and then heating or cooling to form a non-permeable layer of the encapsulating resin over the outside permeable surfaces of the prismatic cell stack.

In one embodiment of the methods of a winding-pressing-filling-sealing sequence of the present invention, the rounded subassembly has an outermost layer by the separator. In one embodiment, after step (b) and prior to step (d), the rounded subassembly is wound with a layer of an insulating film and the film is attached to the rounded subassembly.

In one embodiment of the methods of a winding-pressing-filling-sealing sequence of the present invention, the contacting of the prismatic subassembly in step (f) is performed utilizing a vacuum backfill procedure comprising the steps of: (i) placing the prismatic subassembly in a container; (ii) subjecting the container to a vacuum; (iii) contacting the prismatic subassembly with the electrolyte; and (iv) continuing the contacting of the prismatic subassembly with the electrolyte for a specified total time period. Suitable total time periods for the contacting of the prismatic subassembly in step (f) include a total time period in the range of 0.01 to 50 hours, and, preferably, a total time period in the range of 0.02 to 25 hours, and, more preferably, a total time period in the range of 0.02 to 2 hours. In one embodiment, during step (f), the prismatic subassembly is placed in a fixture to maintain the two substantially parallel flat surfaces during step (f) and the fixture is removed prior to step (h). In another embodiment, during step (f), a strip of material is wound around a circumference of the prismatic subassembly to maintain the two substantially parallel flat surfaces during step (f), and, preferably, the strip is removed prior to step (h). In one embodiment, after step (g) and prior to step (h), excess electrolyte on the outside surfaces of the prismatic cell stack is substantially removed.

Yet another aspect of the present invention pertains to a method of a winding-filling-pressing-sealing sequence for preparing a multilayer electric current producing cell having a casing and a prismatic cell stack having an external length dimension, an external width dimension, an external thickness dimension, two substantially parallel flat surfaces, and outside permeable surfaces; which method comprises, in order, the steps of (a) providing a laminar combination of (i) an anode comprising an anode active layer, which layer comprises a cathode active material comprising lithium, a solid composite cathode comprising a cathode active layer, which layer comprises a cathode active material, the cathode active layer having a first surface and a second opposite surface, the solid composite cathode further comprising a non-permeable current collector in contact with the first surface of the cathode active layer; and (iii) a separator interposed between the anode active layer and the solid composite cathode, and in contact with the second surface of the cathode active layer, wherein the anode active layer and the cathode active layer are positioned in a face-to-face relationship; (b) winding the combination on a mandrel having a cross-section of a rounded shape and having a circumference selected from the lengths consisting of: (i) 140 to 200 per cent of the difference between the external length dimension and the external thickness dimension of the prismatic cell stack, and (ii) 140 to 200 per cent of the difference between the external width dimension and the external thickness dimension of the prismatic cell stack; such winding forming a rounded anode-separator-solid composite cathode subassembly having a jellyroll configuration and a rounded shape; (c) removing the mandrel from the rounded subassembly; (d) contacting the rounded subassembly with a source of a liquid nonaqueous lithium salt electrolyte to form a rounded cell stack, wherein the electrolyte substantially fills porous areas within the rounded cell stack; (e) compressing the rounded cell stack in a press to form a prismatic cell stack, wherein the electrolyte substantially fills porous areas within the prismatic cell stack; (f) removing the prismatic cell stack from the press; (g) enclosing the prismatic cell stack in a barrier material film; and, (h) sealing the film to form the casing.

In one embodiment of the methods of a winding-filling-pressing-sealing sequence of this invention, the rounded shape in step (b) is a circle. In another embodiment, the rounded shape in step (b) is an ellipse. In one embodiment, the circumference of the rounded shape is selected from the lengths consisting of: (i) 150 to 195 per cent of the difference between the external length dimension and the external thickness dimension of the prismatic cell stack and, preferably, the circumference is in the range of 160 to 190 per cent of the difference; and (ii) 150 to 195 per cent of the difference between the external width dimension and the external thickness dimension of the prismatic cell stack and, preferably, the circumference is in the range of 160 to 190 per cent of the difference.

In one embodiment of the methods of a winding-filling-pressing-sealing sequence of the present invention, after step (c) and prior to step (d), the rounded subassembly is shaped into a form that is intermediate between the rounded shape resulting from step (c) and a prismatic shape having two substantially parallel flat surfaces. In one embodiment, prior to step (b), one or more anode tabs are attached to the anode and one or more cathode tabs are attached to the current collector of the solid composite cathode. In another embodiment, one or more anode tabs and one or more cathode tabs extend from the prismatic cell stack and through the casing in an electrically insulated relationship with respect to each other and to the casing.

In one embodiment of the methods of a winding-filling-pressing-sealing sequence of this invention, after step (f) and prior to step (g), the outside permeable surfaces of the prismatic cell stack are encapsulated to form a non-permeable prismatic cell stack. Preferably, this encapsulation is done by immersing the outside permeable surfaces of the prismatic cell stack in a liquid comprising an encapsulating resin, removing the prismatic cell stack from the liquid, and then heating or cooling to form a non-permeable layer of the encapsulating resin over the outside permeable surfaces of the prismatic cell stack.

In another embodiment of the methods of a winding-filling-pressing-sealing sequence of the present invention, the anode comprises an anode active layer comprising lithium further comprises a non-permeable current collector. Preferably, prior to step (b), one or more anode tabs are attached to the non-permeable current collector of the anode and one or more cathode tabs are attached to the current collector of the solid composite cathode. In one embodiment, the non-permeable current collector of the anode comprises a conductive layer having a first surface and an opposite second surface, said first surface being in contact with the anode active layer, wherein the conductive layer is selected from the group consisting of: conductive metals, coatings comprising conductive metal pigments, coatings comprising conductive carbons, coatings comprising conductive graphites, and coatings comprising conductive metal oxide pigments, and, preferably, the second surface of the conductive layer of the non-permeable current collector of the anode is in contact with an insulating layer.

In one embodiment of the methods of a winding-filling-pressing-sealing sequence of this invention, the non-permeable current collector of the solid composite cathode is selected from the group consisting of: conductive metal foils and conductive metal layers on an insulating layer. Preferably, the conductive metal of the non-permeable current collector of said solid composite cathode comprises aluminum and the insulating layer is selected from the group consisting of: plastic films and polymeric coatings. In one embodiment, a conductive layer is interposed between the cathode active layer and the non-permeable current collector of the solid composite cathode, and the conductive pigment layer is selected from the group consisting of: coatings comprising conductive metal pigments, coatings comprising conductive carbons, coatings comprising conductive graphites, and coatings comprising conductive metal oxide pigments.

In one embodiment of the methods of a winding-filling-pressing-sealing sequence of the present invention, the insulating layer of the current collector of the anode and the insulating layer of the current collector of the solid composite cathode are positioned in a face-to-face relationship, and, preferably, the insulating layers positioned in the face-to-face relationship are adhered to each other. In one embodiment, the insulating layers in the face-to-face relationship are adhered to each other by the application of heat, and, preferably the heat is applied during step (b). In another embodiment, prior to step (b), the insulating layers are adhered to each other by the application of an adhesive to one or both of the insulating layers.

In one embodiment of the methods of a winding-filling-pressing-sealing sequence of the present invention, the contacting of the rounded subassembly in step (d) is performed utilizing a vacuum backfill procedure comprising the steps of (i) placing the rounded subassembly in a container; (ii) subjecting the container to a vacuum for a specific time; (iii) contacting the rounded subassembly with the electrolyte; and (iv) continuing the contacting of the rounded subassembly for a total time period. Suitable total time periods for the contacting of the rounded subassembly include, but are not limited to, a total time period in the range of 0.01 to 50 hours, and, preferably, a total time period in the range of 0.02 to 25 hours, and, more preferably, a total time period in the range of 0.02 to 2 hours. In one embodiment, excess electrolyte on the outside surfaces of the prismatic cell stack is substantially removed after step (f) and prior to step (g).

In one embodiment of the methods of the present invention, the separator is a porous polyolefin separator. In another embodiment, the separator comprises a microporous pseudo-boehmite layer. In one embodiment, the separator is coated on the solid composite cathode, and, preferably, the coated separator comprises a microporous pseudo-boehmite layer.

In one embodiment of the methods of the present invention, the press is operated in the range of 100 KPa to 6000 KPa to form the prismatic subassembly or prismatic cell stack. Preferably, the press is operated at a pressure in the range of 200 to 5000 KPa, and, more preferably, in the range of 200 to 3500 KPa. In one embodiment, the press contacts the rounded subassembly or rounded cell stack via a metal surface. In another embodiment, the press contacts the rounded subassembly or rounded cell stack via a rubber surface.

In one embodiment of methods of the present invention, the anode active layer comprises an anode active material selected from the group consisting of: lithium metal, lithium-aluminum alloys, lithium-tin alloys, lithium-intercalated carbons, lithium-intercalated graphites, lithium doped polyacetylenes, lithium doped polyphenylenes, lithium doped polypyrroles, and the like. Preferred anode active materials for the anodes of the method of this invention are lithium metal, lithium-intercalated carbons, and lithium-intercalated graphites.

In one embodiment of the methods of the present invention, the cathode active layer comprises greater than 50 per cent by weight of a sulfur-containing cathode active material and the cathode active layer has a porosity in the range of 20 to 75 per cent by volume. In one embodiment, the cathode active material in the cathode active layer comprises elemental sulfur. In another embodiment, the cathode active material in the cathode active layer comprises a sulfur-containing polymer comprising -$S_m$- moieties, wherein m is an integer equal to or greater than 3.

Still another aspect of the present invention pertains to an electric current producing cell prepared according to the methods of this invention.

As one of skill in the art will appreciate, features of one embodiment and aspect of the invention are applicable to other embodiments and aspects of the invention.

DETAILED DESCRIPTION OF THE INVENTION

Methods of Making a Prismatic Cell

Figure 1:
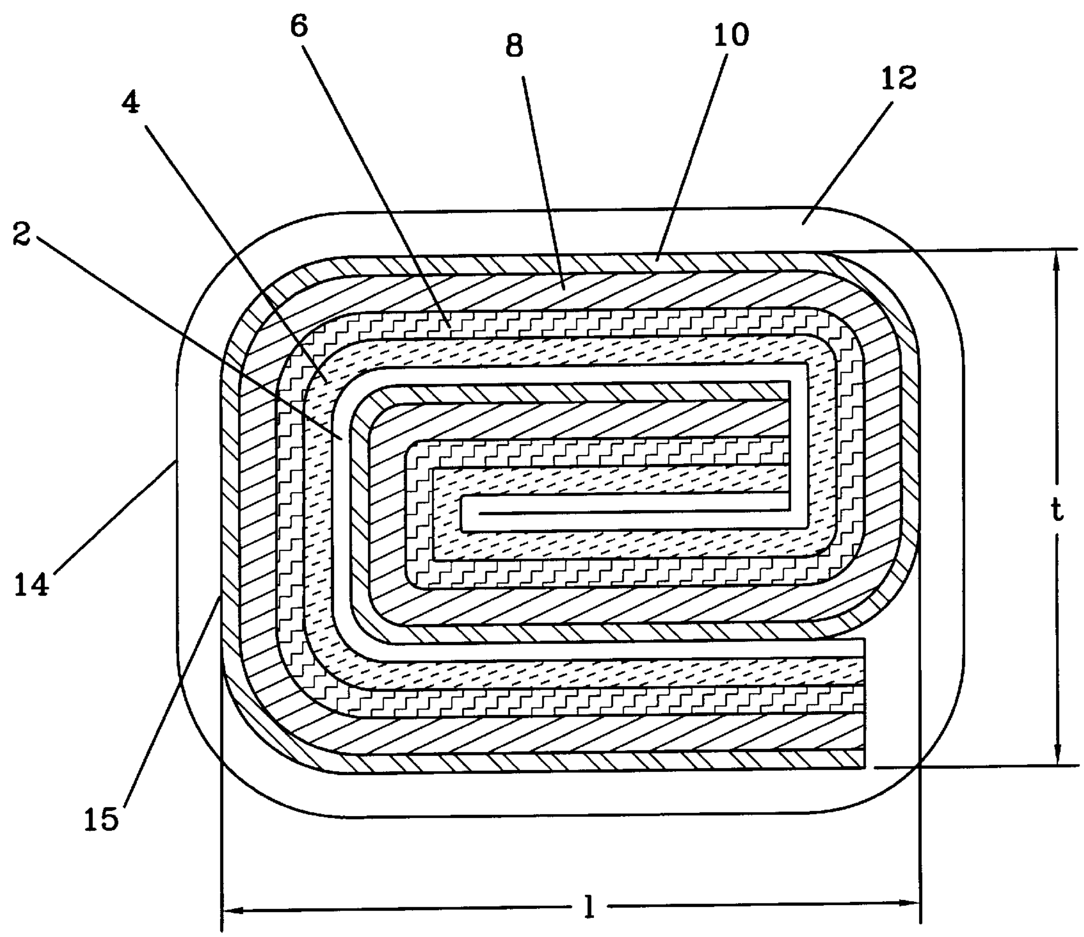
FIG. 1 shows a cross-section view of a multilayer prismatic cell of one embodiment of the present invention.

One aspect of the present invention pertains to a method comprising a winding-pressing-filling-sealing sequence to prepare a multilayer electric current producing cell having a casing and a prismatic cell stack having an external length dimension, an external width dimension, an external thickness dimension, two substantially parallel flat surfaces, and outside permeable surfaces; which method comprises, in order, the steps of (a) providing a laminar combination of: (i) an anode comprising a anode active layer, which layer comprises an anode active material comprising lithium; (ii) a solid composite cathode comprising a cathode active layer, which layer comprises a cathode active material, the cathode active layer having a first surface and a second opposite surface, the solid composite cathode further comprises a non-permeable current collector in contact with the first surface of the cathode active layer, and (iii) a separator interposed between the anode and the solid composite cathode, and in contact with the second surface of the cathode active layer, wherein the anode active layer and the cathode active layer are positioned in a face-to-face relationship; (b) winding the combination on a mandrel having a cross-section of a rounded shape and having a circumference; such winding forming a rounded anode-separator-solid composite cathode subassembly having a jelly-roll configuration and a rounded shape; (c) removing the mandrel from the rounded subassembly; (d) compressing the rounded subassembly in a press to form a prismatic subassembly having two substantially parallel flat surfaces; (e) removing the prismatic subassembly from the press; (i) contacting the prismatic subassembly with a source of a liquid nonaqueous lithium salt electrolyte to form a prismatic cell stack, wherein the electrolyte substantially fills porous areas within the prismatic cell stack; (g) removing the prismatic cell stack from contact with the source of the electrolyte; (h) enclosing the prismatic cell stack in a barrier material film; and (i) sealing the film to form the casing with a prismatic shape. This method of contacting a prismatic subassembly with a source of electrolyte increases the efficiency of filling the separator and cathode with electrolyte, particularly when cathode active layers are difficult to fill because of a large surface area, many layers in the cell, a low porosity of the cathode active layer in order to maximize the energy density of cathode active material, and a non-permeable current collector on one side of the cathode active layer. In one embodiment, the circumference of the mandrel in step (b) is selected from the lengths consisting of: (i) 140 to 200 per cent of the difference between the external length dimension and the external thickness dimension of the prismatic cell stack, and (ii) 140 to 200 per cent of the difference between the external width dimension and the external thickness dimension of the prismatic cell stack.

Another aspect of the present invention pertains to a method comprising a winding-filling-pressing-sealing sequence to prepare a multilayer electric current producing cell having a casing and a prismatic cell stack, said prismatic cell stack having an external length dimension, an external width dimension, an external thickness dimension, two substantially parallel flat surfaces, and outside permeable surfaces. This method differs from the method comprising a winding-pressing-filling-sealing sequence of this invention in that the steps of pressing and filling are done in the reverse order. Filling before the pressing step may be advantageous when the combination of a low porosity of the cathode active layer and of a higher viscosity or otherwise slower imbibing electrolyte makes filling difficult. Further, the electrolyte may be forced by the pressure of pressing to penetrate more fully and fill more evenly into the porous areas of the prismatic cell. This reverse order of filling and pressing in the methods of the present invention still retains the advantages of winding on a relatively large diameter rounded mandrel and of enclosing and sealing after the electrolyte is introduced into the cell stack. In particular, the method comprising a winding-filling-pressing-sealing sequence comprises, in order, the steps of (a) providing a combination of: (i) an anode comprising an anode active layer, which layer comprises an anode active material comprising lithium; (ii) a solid composite cathode comprising a cathode active layer, which layer comprises a cathode active material, the cathode active layer having a first surface and a second opposite surface, the solid composite cathode further comprising a non-permeable current collector in contact with the first surface of the cathode active layer; and (iii) a separator interposed between the anode and the solid composite cathode, and in contact with the second surface of the cathode active layer, wherein the anode active layer and the cathode active layer are positioned in a face-to-face relationship; (b) winding the combination on a mandrel having a cross-section of a rounded shape and having a specified circumference, which circumference is selected from the lengths consisting of: (i) 140 to 200 per cent of the difference between the external length dimension and the external thickness dimension of the prismatic cell stack, and (ii) 140 to 200 per cent of the difference between the external width dimension and the external thickness dimension of the prismatic cell stack; such winding forming a rounded anode-separator-solid composite cathode subassembly having a jellyroll configuration and a rounded shape; (c) removing the mandrel from the rounded subassembly; (d) contacting the rounded subassembly with a source of a liquid nonaqueous lithium salt electrolyte to form a rounded cell stack wherein the electrolyte substantially fills porous areas within the rounded cell stack; (e) compressing the rounded cell stack in a press to form a prismatic cell stack, wherein the electrolyte substantially fills porous areas within the prismatic cell stack; (f) removing the prismatic cell stack from the press; (g) enclosing the prismatic cell stack in a barrier material film; and, (h) sealing the film to form the casing.

The effective electrolyte filling provided by the methods of the present invention is adapted for use with a wide variety of combinations of nonaqueous lithium salt electrolytes and of cathode active layers and solid composite cathodes in electric current producing cells with anodes comprising lithium. The methods of the present invention are particularly preferred for use in rechargeable batteries which require a high energy density and have relatively thin solid composite cathode and anode layers, such as thicknesses of 25 microns or less for each layer. More particularly, the methods of this invention are preferred for use in electric current producing cells which have a prismatic shape and have relatively thin cathode active layers whose pores are difficult to fill with electrolyte because of low porosity of the cathode active layer, a non-permeable current collector adjacent to one side of the cathode active layer, a large surface area of cathode active layer in the cell, and the viscosity and other properties of the electrolyte. Most particularly, the methods of the present invention are preferred for use in electric current producing cells which utilize electroactive sulfur-containing cathodes.

Multilayer Electric Current Producing Cells

The term "electric current producing cell," as used herein, pertains to a device that produces an electric current through an electrochemical reaction and that contains a positive electrode or cathode, a negative electrode or anode, and an electrolyte element. To prevent the undesirable flow of electrons that would occur in an internal short circuit from the anode to the cathode, an electrolyte element is interposed between the cathode and the anode.

The electrolyte element in electric current producing cell must be electronically non-conductive to prevent short circuiting, but must be ionically conductive to permit the transport of positive ions between the anode and the cathode. The electrolyte element should also be stable electrochemically and chemically toward both the anode and the cathode.

In one embodiment, the electrolyte element for use with the anodes contains a porous material, referred to herein as a separator, and a non-aqueous electrolyte, which typically comprises an ionic electrolyte salt and an electrolyte solvent, in the pores of the separator. The separator insulates or separates the anode and the cathode from undergoing an internal short circuit. Suitable porous separators include, but are not limited to, polyolefins such as polyethylenes and polypropylenes, glass fiber filter papers, and ceramic materials. Usually these separators are supplied as a porous free standing film which is interleaved with the anode and the cathode in the fabrication of the electric current producing cells.

An electrochemically active material used in the cathode active layer is referred to herein as a cathode active material. An electrochemically active material used in the anode active layer is herein referred to as an anode active material. An electric current producing cell comprising a cathode active layer with the cathode active material in an oxidized state and an anode active layer with the anode active material in a reduced state is referred to as being in a charged state. Accordingly, an electric current producing cell comprising a cathode active layer with the cathode active material in a reduced state, and an anode active layer with the anode active material in an oxidized state, is referred to as being in a discharged state. Discharging an electric current producing cell in its charged state by allowing electrons to flow from the anode to the cathode through an external circuit results in the electrochemical reduction of cathode active material in the cathode and the electrochemical oxidation of anode active material in the anode. To facilitate the efficient flow of electrons through this external circuit, an electrically conductive current collector may be placed in contact with the surface of each electrode on the side opposite to the separator. The term, "cathode current collector," as used herein, pertains to the electrically conductive current collector in contact with the cathode active layer. The terms, "solid composite cathode" and "cathode," as used herein, are synonymous and pertain to the combination of the cathode active layer and the cathode current collector. The term, "anode current collector," as used herein, pertains to the electrically conductive current collector in contact with the anode active layer. The term, "anode," as used herein, pertains to the combination of the anode active layer and the anode current collector, if one is present. These current collectors are useful in efficiently collecting the electrical current generated throughout the respective electrodes and in providing an efficient surface for attachment of the electrical contacts leading to the external circuit.

The term "multilayer electric current producing cell," as used herein, pertains to an electric current producing cell which has more than one electric current producing layer, for example, comprising a combined anode-separator-solid composite cathode construction when viewed in a cross-section of at least one profile plane. This is illustrated in FIG. 1, which shows a cross-section of a profile plane of the width and height of an electric current producing cell of a prismatic shape. In FIG. 1, four electric current producing layers, each containing an anode current collector 2, an anode active layer comprising lithium 4, a separator 6, a cathode active layer 8, and a non-permeable cathode current collector 10, are shown. When viewed through a cross-section profile of two of its dimensions, a multilayer electric current producing cell may have two or more of these electric current producing layers. As the thickness of each of these electric current producing layers are reduced in order to provide improved performance properties, such as, for example, higher charge rates, more capacity by reducing the amount of non-electroactive materials, improved safety, and more efficient filling of electrolyte materials into a thinner cathode active layer and a thinner separator, the total number of these electric current producing layers in a multilayer electric current producing cell of a given size increases. Even in a small electric current producing cell of a prismatic shape with a height dimension of only 3.5 mm, the number of these electric current producing layers may be in the range of 25 to 100, or even higher, while providing improved cell performance by reducing the thickness of the cathode active layer and increasing the total surface area of each component of the electric current producing layer. For larger electric current producing cells, the number of these electric current producing layers may be progressively much higher.

One of the challenges in assembling multilayer electric current producing cells, particularly as the electric current producing layers become thinner and greater in number, is to effectively fill porous areas of the cell, particularly porous areas of the separator and the cathode active layer, with liquid electrolyte without having undesirable amounts of liquid electrolyte present outside these active areas of the cell. This filling with electrolyte is made particularly difficult when the porosity of the cathode active layer is reduced in order to provide a greater amount of cathode active material in each cell, and when the separator is made thinner and thus does not provide as much pore volume for the electrolyte to occupy. This difficulty is further compounded when one or more of the components of each electric current producing layer are non-permeable to the electrolyte so that filling of porous areas can not occur by flow or diffusion through these non-permeable components. For example, a lithium metal anode, such as a lithium foil, is non-permeable to liquid electrolytes, and many cathode current collectors are non-permeable to liquid electrolytes. In the case of a non-permeable anode and a non-permeable cathode current collector, as may be seen by referring to FIG. 1, the liquid electrolyte during the filling process can only reach porous areas of the separator and the cathode active layer of each electric current producing layer by entering at the open ends of each layer, and not by flowing or diffusing between electric current producing layers.

The term “prismatic,” as used herein, pertains to a solid shape where at least two surfaces are substantially flat and parallel to each other. FIG. 1 shows a cross-section view of an electric current producing cell of a prismatic shape. The term “casing,” as used herein, pertains to the outermost surface of the electric current producing cell, where the outer surface is adjacent to the combined electric current producing layers or prismatic cell stack and acts as a seal or barrier against the transport of liquids or volatile materials into or out of the cell stack. This is illustrated in FIG. 1 where the casing 12 is the outer surface of the electric current producing prismatic cell 14 and where the upper and lower layers of both the casing 12 and the adjacent upper and lower surfaces of the prismatic cell stack 15 are substantially flat and parallel to each other. The portion of the cell 15 without the casing 12 is referred to herein as the prismatic cell stack. The prismatic cell stack 15 comprises the wound electric current producing layers, pores of which are filled with liquid electrolyte.

Methods of Assembling a Prismatic Cell

In order to provide the multilayer cell construction of many electric current producing layers in an efficient electric current producing cell having a prismatic shape, the methods of the present invention comprise a number of steps. In a first step, an anode 16, a separator 6 interposed between the anode and the cathode, and a solid composite cathode 18 comprising a cathode active layer 8 with a cathode active material and a non-permeable cathode current collector 10 are provided in a laminar combination of layers wherein the anode active layer of the anode and the cathode active layer are in a face-to-face relationship. One embodiment of this combination is illustrated in combination step 102 in FIG. 2. In the embodiment where the anode is a lithium foil and the solid composite cathode comprising a non-permeable cathode current collector both have the property of being non-permeable to the flow or diffusion of liquid electrolytes through either layer from one side of the layer to the other.

Figure 2:
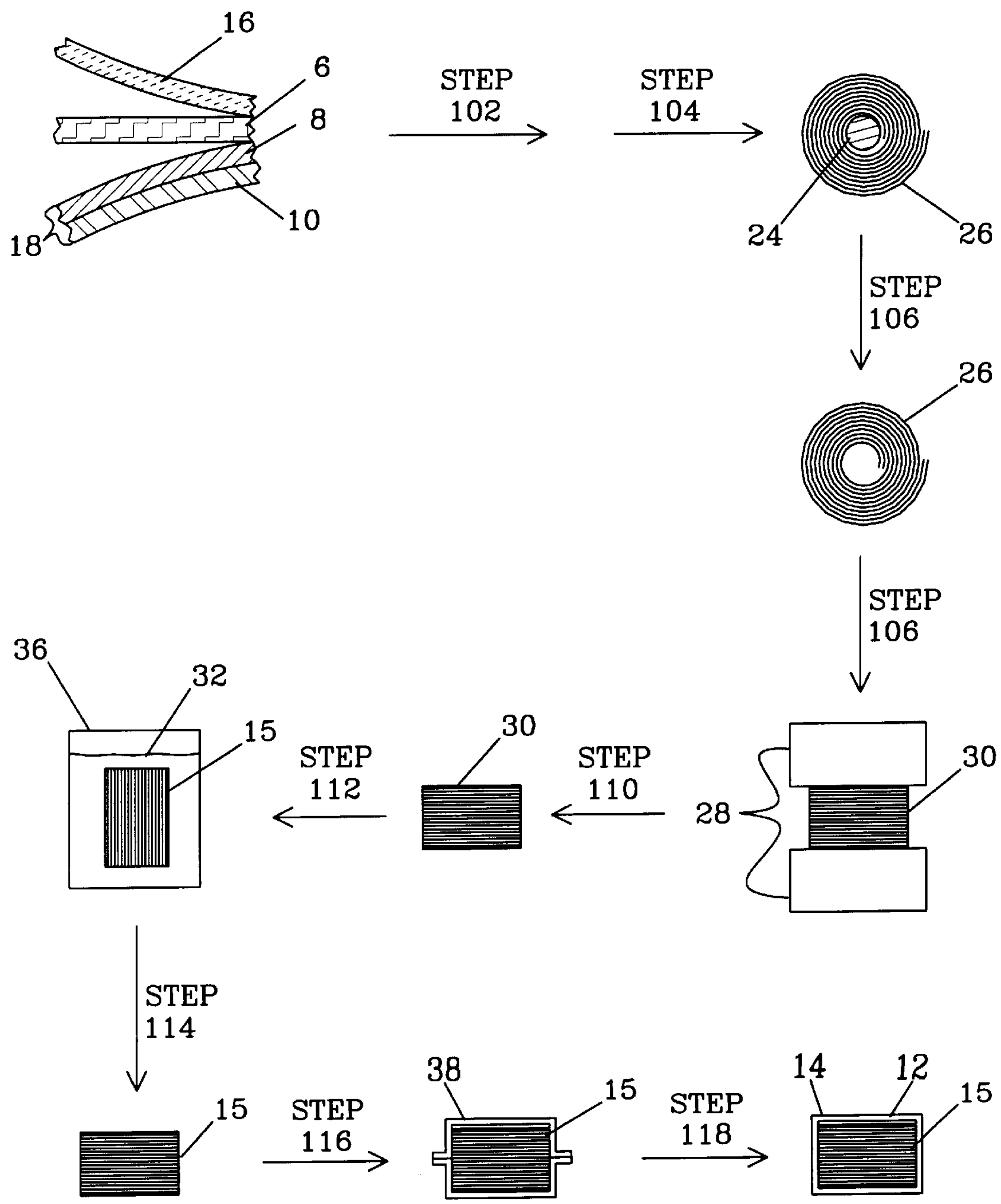
FIG. 2 shows a flow diagram of a winding-pressing-filling-sealing method of preparing a prismatic cell of the present invention.

In a subsequent step, the laminar combination of anode 16, separator 6, and solid composite cathode 18 of step 102 is wound on a mandrel 24 having a cross-section of a rounded shape and having a circumference. As illustrated in FIG. 2, the winding step 104 forms a rounded anode-separator-solid composite cathode subassembly 26 having a jellyroll configuration. Subsequent to the winding step 104, the mandrel 24 is removed from the rounded anode-separator-solid composite cathode subassembly 26 in a mandrel removal step 106.

Subsequent to the mandrel removal step 106, for the methods comprising a winding-pressing-filling-sealing sequence of the present invention, as illustrated in FIG. 2, the rounded subassembly 26 is then placed in a press 28 and compressed in a compressing step 108 to form a prismatic subassembly 30 having two substantially parallel flat surfaces. Subsequent to the compressing step 106, the prismatic subassembly 30 is removed from the press 28 in a press removal step 110. Subsequent to the removal step 110, the prismatic subassembly 30 is contacted with a source of a liquid nonaqueous lithium salt electrolyte 32 in a contacting step 112 to form a prismatic cell stack 15 having two substantially parallel flat surfaces and having the electrolyte 32 substantially fills porous areas in the prismatic cell stack 15, as illustrated in FIG. 2. For the contacting step 112, the liquid electrolyte 32 is typically contained in a tank 36 in which the prismatic subassembly 30 is immersed fully or partially or, alternatively, contacted with the top surface of the liquid electrolyte. Subsequent to the contacting step 112, the prismatic cell stack 15 is removed from contact with the source of the liquid electrolyte 32 in a cell stack removal step 114. Subsequent to the removal step 114, the prismatic cell stack 15 is enclosed in a barrier material film 38, as illustrated in FIG. 2. A subsequent sealing step 118 forms a casing 12 with a prismatic shape for the exterior of the multilayer electric current producing cell 14, as illustrated in FIG. 2.

Figure 3:
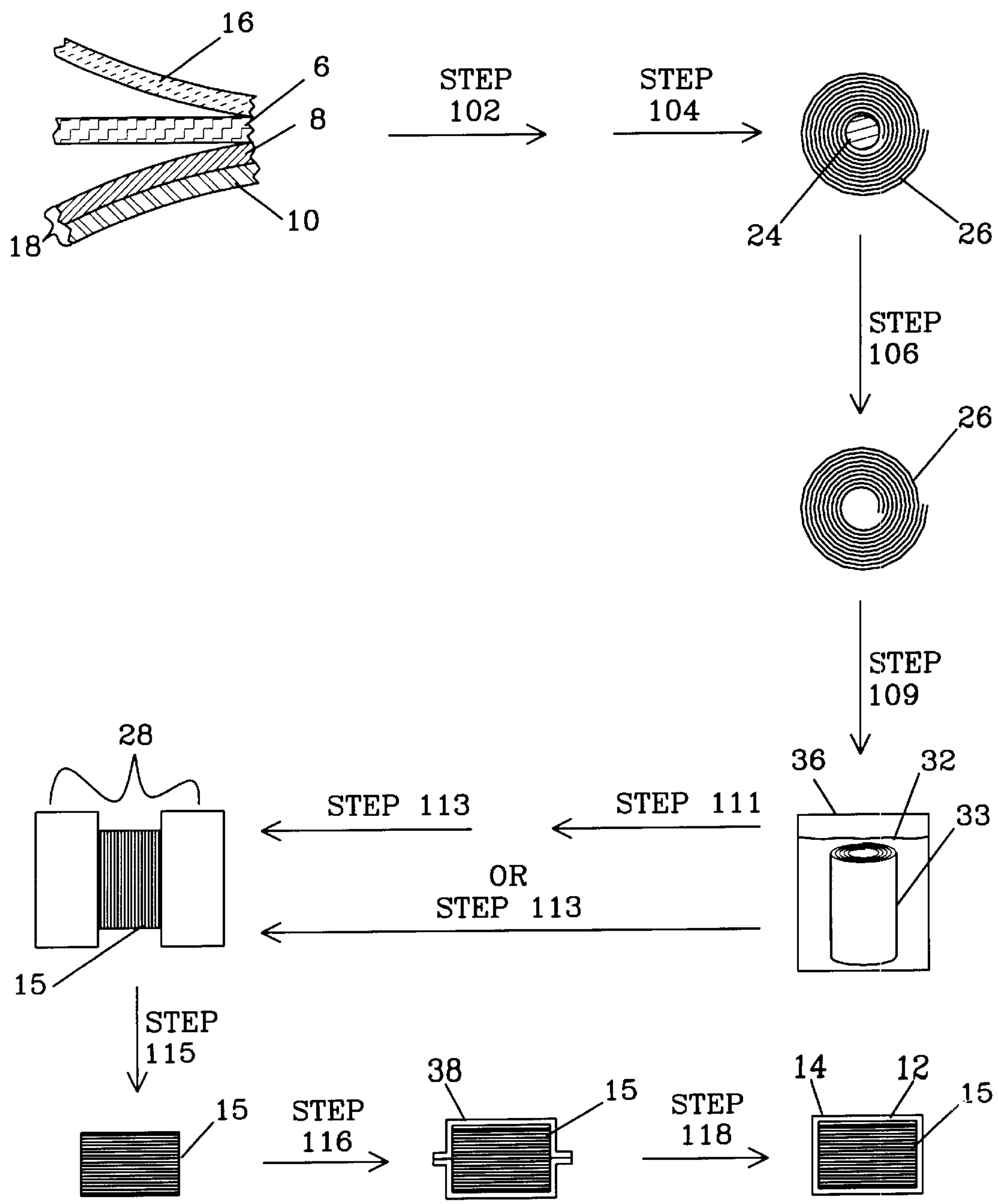
FIG. 3 shows a flow diagram of a winding-filling-pressing-sealing method of preparing a prismatic cell of the present invention.

Alternatively, subsequent to the mandrel removal step 106, for the methods comprising a winding-filling-pressing-sealing sequence of the present invention, as illustrated in FIG. 3, the rounded subassembly 26 is contacted to a source of liquid nonaqueous lithium salt electrolyte 32 in a contacting step 109 to form a rounded cell stack 33 having the electrolyte 32 substantially fills porous areas of the rounded cell sack. For the contacting step 109, the liquid electrolyte 32 is typically contained in a tank 36 into which the rounded subassembly 26 is immersed fully or partially or, alternatively, is contacted to the top surface of the liquid electrolyte 32. Subsequent to the contacting step 109, the rounded cell stack 33 may be removed from contact with the source of the liquid electrolyte 32 in a cell stack removal step 111 before the subsequent compression step 113. Alternatively, the rounded cell stack 33 may remain in contact with the source of the liquid electrolyte 32 during a subsequent compressing step 113. As illustrated in FIG. 3, subsequent to the contacting step 109, the rounded cell stack 33 is placed in a press 28 and compressed in a compressing step 113 to form a prismatic cell stack 15 having two substantially flat and parallel surfaces. Subsequent to the compressing step 113, the prismatic cell stack 15 is removed from the press in a press removal step 115, as illustrated in FIG. 3. Subsequent to the removal step 115, the prismatic cell stack 15 is enclosed in a barrier material film 38, as illustrated in FIG. 3. A subsequent sealing step 118 forms a casing 12 with a prismatic shape for the exterior of the multilayer electric current producing cell 14, as illustrated in FIG. 3.

The methods of making a prismatic cell of the present invention are particularly advantageous in providing an efficient combination of winding, pressing to a prismatic shape, and filling with electrolyte through the use of a rounded mandrel with a relatively large circumference for the winding step, and subsequently filling with electrolyte before enclosing and sealing the prismatic cell stack with the barrier material film.

Methods of Winding on a Rounded Mandrel

Winding a multilayer electric current producing cell on a rounded mandrel to provide a spiral, non-prismatic cell is well known in the art of battery fabrication, as, for example, described in U.S. Pat. No. 4,709,472 to Machida et al. and U.S. Pat. No. 5,700,299 to Clark. The '299 patent describes the use of an arbor or mandrel of minimal diameter.

Figure 4:
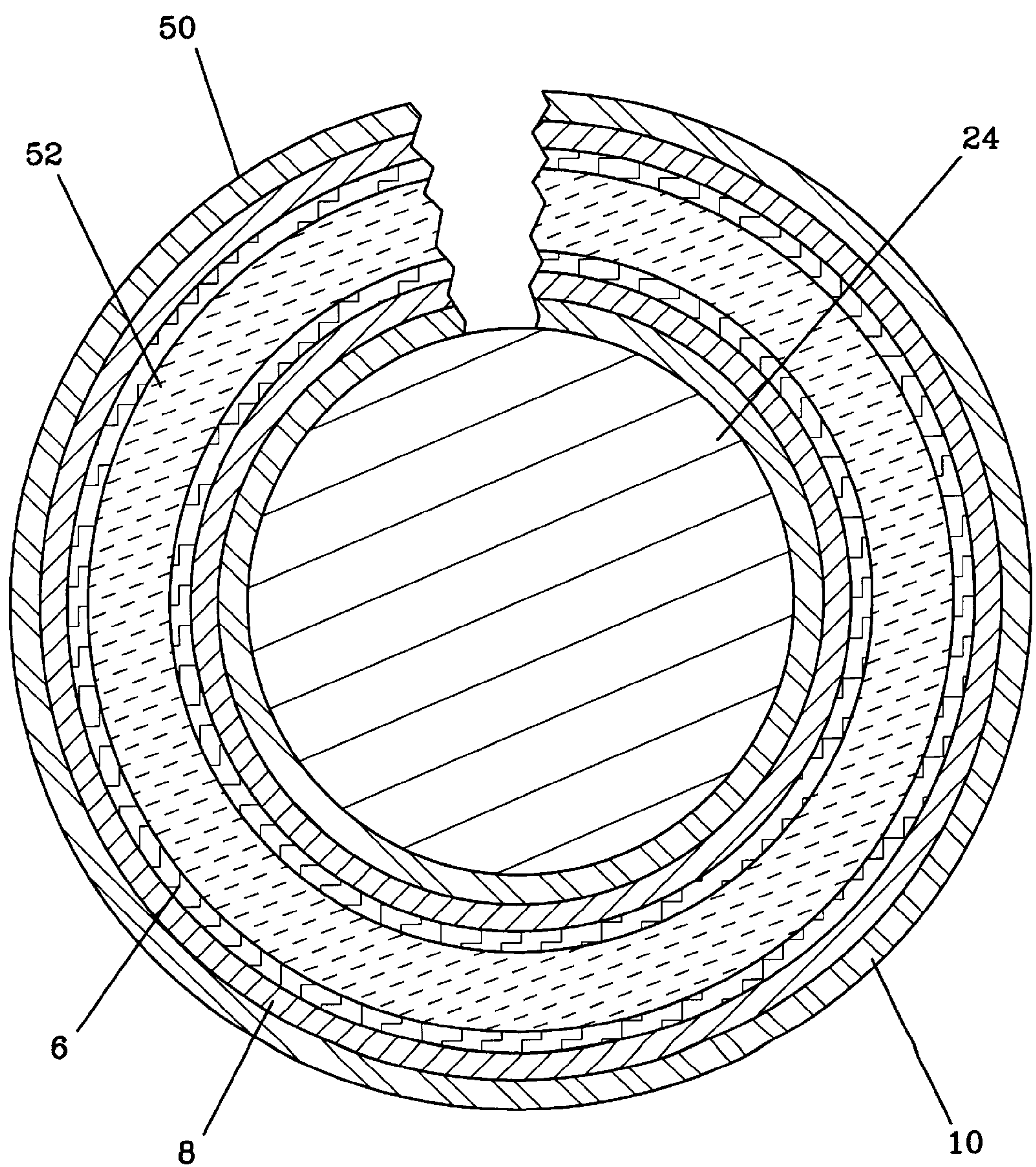
FIG. 4 shows a mandrel shape and a jellyroll configuration for one embodiment of the method of preparing a prismatic cell of this invention.

For use in preparing a prismatic cell in the methods of the present invention, FIG. 4 illustrates a cross-section view of a laminar combination of anode-separator-solid composite cathode subassembly 50 wound on a mandrel 24 having a cross-section of a rounded shape and having a circumference. The electric current producing layer differs from that illustrated in FIG. 1 in that the anode 52 is lithium metal foil in FIG. 4 and there is no distinct anode current collector. The lithium metal foil also acts as the anode current collector, as shown in FIG. 4. Since the lithium metal foil anode 52 has anode active material on both sides of the layer, it may be utilized as a "double-sided" anode with a cathode active layer in a face-to-face relationship with each anode surface with a separator interposed between each lithium metal and cathode active layer combination. One embodiment where the solid composite cathode comprising the cathode active layer and the cathode current collector is "single-sided", i.e., the solid composite cathode has a cathode active layer with cathode active material on one surface and the cathode current collector on the opposite surface, is illustrated in FIG. 4. The term, "jellyroll," as used herein, pertains to electric current producing layers that have been rolled around a core center position to build up and form a multilayer combination of these layers. In this embodiment illustrated in FIG. 4, the electric current producing layer of the multiple layers of the electric current producing layer comprises a non-permeable cathode current collector 10, a cathode active layer 8, a separator 6, an anode 52 of lithium foil, a separator 6, a cathode active layer 8, and a non-permeable cathode current collector 10 which are wound on a rounded mandrel 24 in a jellyroll configuration. A wide variety of combinations of anode-separator-solid composite cathode layers may be utilized in the methods of this invention provided that the anode active layer comprising lithium and the cathode active layer are wound in a face-to-face relationship with a separator interposed between them. Suitable combinations include, but are not limited to, double-sided anodes with single-sided cathodes, as illustrated in FIG. 4; single-sided anodes with single-sided cathodes, as illustrated in FIG. 1; double-sided anodes with double-sided cathodes; anodes and cathodes where the separator is coated or attached to either the anode or the cathode prior to the winding step; and single-sided anodes and cathodes which are coated on opposite sides of a shared insulating layer.

In one embodiment, the rounded shape of the cross-section of the mandrel used in the winding step of the methods of the present invention is a circle. In one embodiment, the rounded shape of the cross-section of the mandrel is an ellipse.

Figure 5:
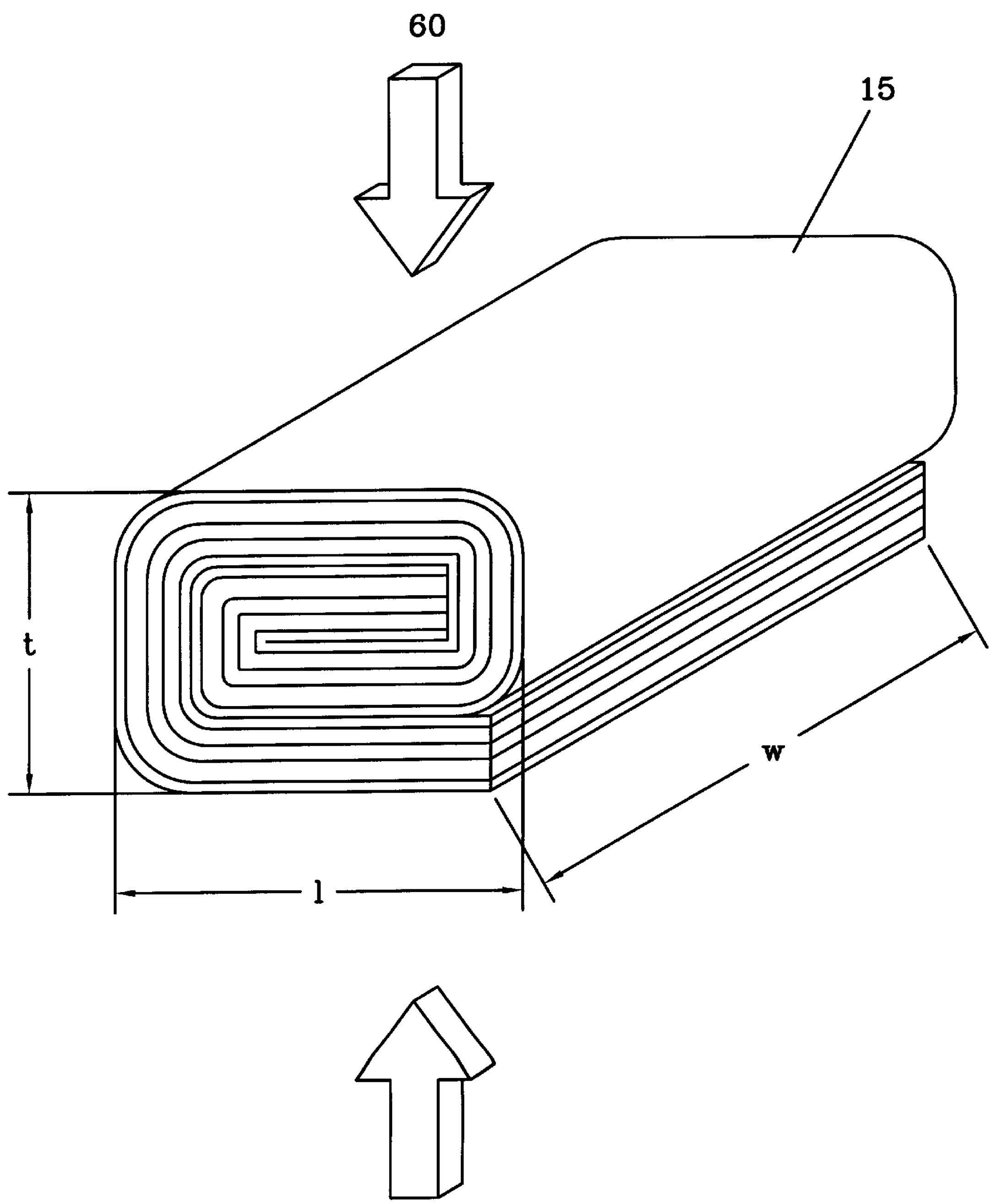
FIG. 5 illustrates the dimensions of a prismatic cell stack of the present invention.

The dimensions of the prismatic cell stack produced in the methods of the present invention depends on the widths and lengths of the anode, separator, and solid composite cathode layers wound on the mandrel and also depends on the circumference of the rounded mandrel. Typically, the anode, separator, and solid composite cathode are of similar, but distinct, widths and lengths and may be slightly offset from each other on the edges to allow for more efficient electrical connections by tabs and other electrical contacts and for more effective insulation against internal short circuits, as known in the art of battery fabrication as, for example, described in U.S. Pat. No. 5,439,760 to Howard et al. and U.S. Pat. No. 5,549,717 to Takeuchi et al. As such, the widths of these layers are typically oriented in the prismatic cell to correspond to the sides of the prismatic cell stack which will be utilized in the electrical connections leading to the external circuit. In this case, the circumference of the rounded mandrel largely determines the dimension of the cross-direction to the dimension being utilized for the electrical contacts. Since either dimension may be referred to as the length or width of the prismatic cell, it is not possible to designate the dimension being used for the electrical contacts to always be the length of the prismatic cell stack. Thus the length and width may be used interchangeably to refer to the dimensions perpendicular to the thickness dimension, which is the smallest dimension and the dimension parallel to the direction of the compression pressure 60 used to shape the rounded subassembly or rounded cell stack, as illustrated in FIG. 5. Also, the anode, separator, and solid composite cathode may be of identical widths and may be wound on the mandrel in widths greater than the desired dimension in the prismatic cell and subsequently may be cut down to the desired dimension.

FIG. 5 shows the length l, width w, and thickness t of a typical prismatic cell stack 15 as measured by its external dimensions. As discussed herein, the dimension which depends on the circumference of the mandrel may be designated as either the length l or the width w. The thickness dimension t as shown in FIG. 5 is the dimension in the direction of the applied compression pressure shown by the arrow 60 used to shape the rounded subassembly or rounded cell stack. One feature of the methods of the present invention is the relatively large circumference of the rounded mandrel. This facilitates the winding step 104 by helping to maintain close contact among the various layers and an even pressure throughout the jellyroll. The relatively large opening produced when the mandrel is removed in the removal step 106 as well as the tight and uniform winding of the multilayer jellyroll also contributes to an efficient compressing step 108 and in turn to an efficient contacting step 112, as illustrated in FIG. 2, as well as to an efficient contacting step 109 and in turn to an efficient compressing step 113, as illustrated in FIG. 3.

As illustrated in the cross-section view of FIG. 1, the dimension of the prismatic cell stack 15 largely determined by the circumference of the rounded mandrel is the direction parallel to the edges of the cell where the electrical connections to the external circuit are typically made. In FIG. 1, this is the length l of the prismatic cell stack 15. The innermost layers illustrated in FIG. 1 is the anode current collector 2 represent the surfaces originally in contact with the circumference of the mandrel during the winding step. The innermost layer may be either the solid composite cathode layer or the anode. As illustrated in FIG. 1, the successive layers of the multilayer jellyroll also contribute to this length dimension by their buildup in thickness at both ends of the length dimension. Thus, the build up of these successive layers of the multilayer jellyroll largely determine the thickness of the prismatic cell stack, as illustrated in FIG. 1.

In one embodiment, the circumference of the rounded mandrel of the methods of the present invention is selected from the lengths consisting of: (i) 140 to 200 per cent of the difference between the external length dimension and the external thickness dimension of the prismatic cell stack, and (ii) 140 to 200 per cent of the difference between the external width dimension and the external thickness dimension of the prismatic cell stack. In one embodiment, the circumference of the rounded mandrel is selected from the lengths consisting of: (i) 150 to 195 per cent of the difference between the external length dimension and the external thickness dimension of the prismatic cell stack, and (ii) 150 to 195 per cent of the difference between the external width dimension and the external thickness dimension of the prismatic cell stack. In a preferred embodiment, the circumference of the rounded mandrel is selected from the lengths consisting of: (i) 160 to 190 per cent of the difference between the external length dimension and the thickness of the external thickness dimension of the prismatic cell stack, and (ii) 160 to 190 per cent of the difference between the external width dimension and the external thickness dimensions of the prismatic cell stack.

Methods of Compressing

Figure 6:
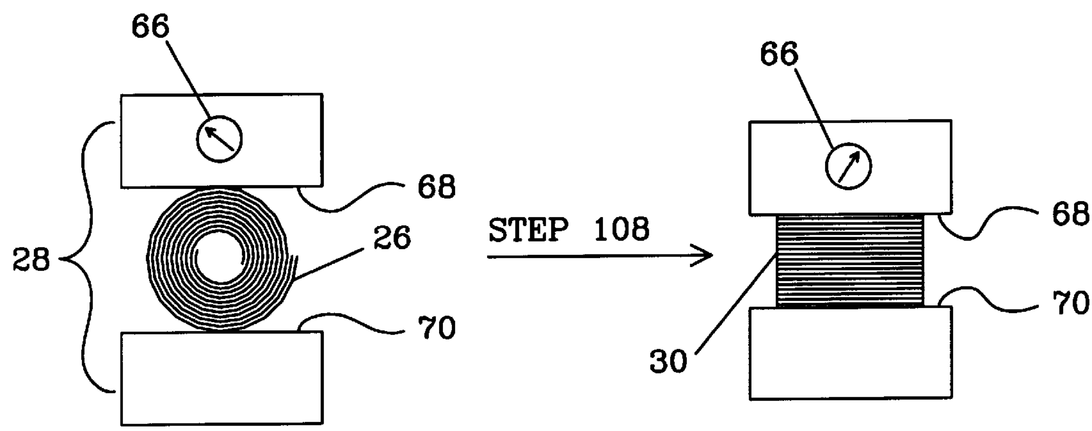
FIG. 6 illustrates a pressing step for a winding-pressing-filling-sealing method of preparing a prismatic cell of one embodiment of the present invention.

For the methods comprising a winding-pressing-filling-sealing sequence of the present invention, as illustrated in FIG. 2, subsequent to the mandrel removal step 106, the rounded subassembly 26 is placed in a press 28 and compressed in a compressing step 108. Compressing a jellyroll combination of an anode-separator-cathode subassembly into a prismatic shape having a substantially rectangular cross-section is known in the art, as, for example, described in U.S. Pat. No. 5,549,717 to Takeuchi et al. Any press that has sufficient physical dimensions to hold the rounded subassembly between the surfaces or jaws that will apply the compressing pressure and has sufficient compressing pressure to apply the desired pressure and to achieve the desired compression may be utilized. As illustrated in FIG. 6, the press 28 may have an upper and lower jaw between which the rounded subassembly 26 is placed. The rounded subassembly 26 rests on the lower surface 70 while the upper surface 68 is lowered by the operation of the press 28 to apply the desired pressure and compression. In order to control the amount of pressure applied, a pressure gauge 66 to measure this pressure is typically an integral part of the press 28.

Figure 7:
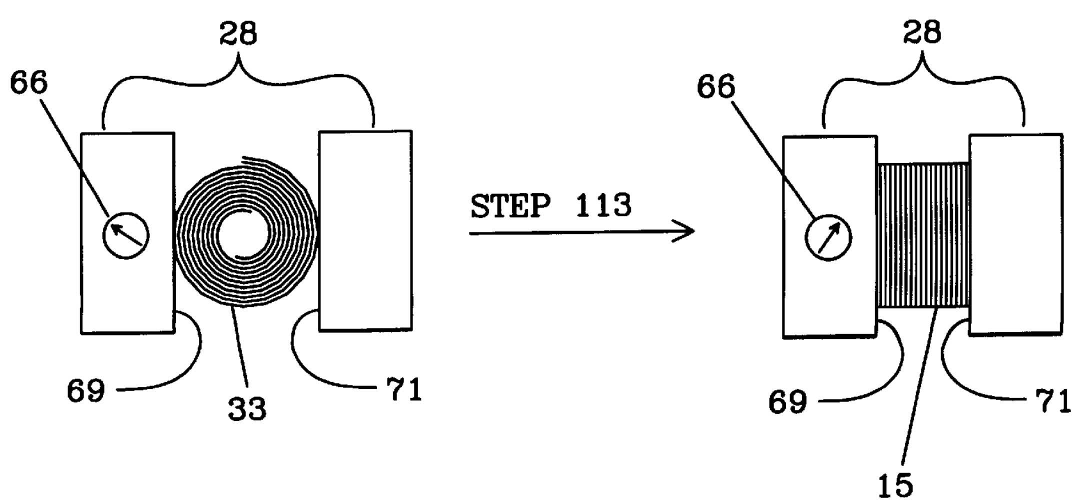
FIG. 7 illustrates a pressing step for a winding-filling-pressing-sealing method of preparing a prismatic cell of one embodiment of the present invention.

For the methods comprising a winding-filling-pressing-sealing sequence of this invention, as illustrated in FIG. 3, subsequent to the contacting step 109, the rounded cell stack 33 is placed in a press 28 and compressed in a compressing step 113. As illustrated in FIG. 7, the press 28 may have a vertical orientation of two parallel jaws between which the rounded cell stack 33 is placed. Optionally, during the compressing step 113, the rounded cell stack 33 may be fully or partially immersed in a container of a liquid electrolyte or, alternatively, be in contact with a surface of a liquid electrolyte, for example, as is done in the contacting steps of the methods of this invention. Any press that has sufficient physical dimensions to hold the rounded cell stack between the surfaces or jaws that will apply the compressing pressure and has sufficient compressing pressure to apply the desired pressure and to achieve the desired compression may be utilized. Typically, for example, the rounded cell stack 33 is held between the surfaces 69 and 71 of the press 28 and then the press is operated to apply the desired pressure and compression. In order to control the amount of pressure applied, a pressure gauge 66 to measure this pressure is typically an integral part of the press 28.

In one embodiment, the press is operated at a pressure in the range of 100 to 600 KPa to form the prismatic subassembly or the prismatic cell stack. In a preferred embodiment, the press is operated at a pressure in the range of 200 to 5000 KPa to form the prismatic subassembly or the prismatic cell stack. In a more preferred embodiment, the press is operated at a pressure in the range of 200 to 3500 KPa to form the prismatic subassembly or prismatic cell stack. In addition to the pressure applied by the press, the duration of this pressure is also important. Suitable times of duration of applying the pressure to compress the rounded subassembly or the rounded cell stack include, but are not limited to, 1 second to 5 minutes. The longer time periods have the disadvantage of reducing the productivity of the compressing step. Typical time periods for the compressing step are in the range of 10 to 60 seconds.

While not be held to any theory, it is believed that when the anode active layer is lithium metal foil which is soft and formable, the lithium foil may behave similar to an adhesive and bond to the separator surface to form an intimate interface.

The material used for the surfaces of the press in contact with the rounded subassembly or the rounded cell stack contributes to the uniformity and consistency of the compressing step. In one embodiment, the press contacts the rounded subassembly or the rounded cell stack is via a metal surface. In one embodiment, the press contacts the rounded subassembly or the rounded cell stack via a rubber surface. The durometer or hardness of the rubber material may be selected depending on the particular compositions and substrates present in the rounded subassembly or the rounded cell stack and on the particular level of compression desired.

One advantage of the pressing sequences of the present invention is that it may eliminate air bubbles that may have been formed between the cell layers during the winding step, this helps to achieve an intimate interface between the cell layers and helps to prevent electrolyte puddleing or starvation in areas of the cell.

Methods of Filling with Electrolyte

For the methods comprising a winding-pressing-filling-sealing sequence of the present invention, as illustrated in FIG. 2, subsequent to the compressing step 108 and the removal step 110, the prismatic subassembly 30 is contacted with a source of a liquid nonaqueous lithium salt electrolyte 32 in a contacting step 112. Similarly, in the alternative winding-filling-pressing-sealing sequence of the methods of this invention, as illustrated in FIG. 3, subsequent to the mandrel removal step 106, the rounded subassembly 26 is contacted with a source of a liquid nonaqueous lithium salt electrolyte 32 in a contacting step 109.

Figure 8A:
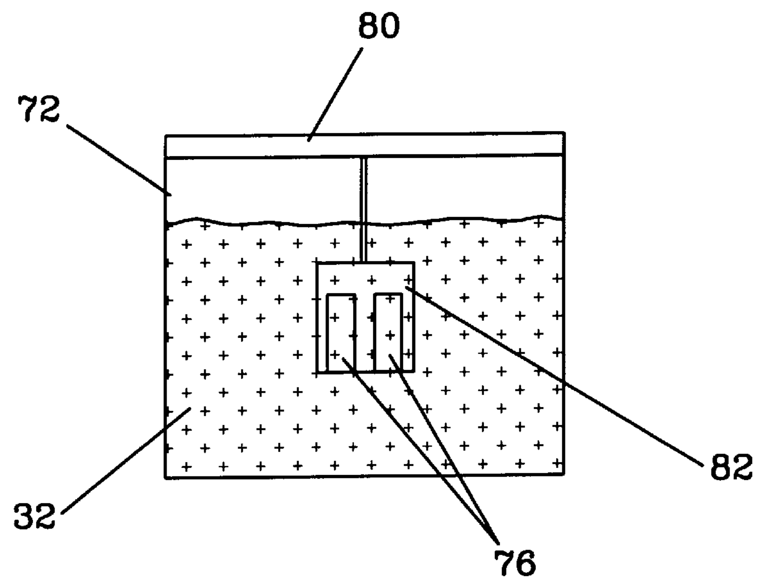
FIGS. 8(*a*) and (*b*) illustrate two embodiments of the methods of the present invention for contacting the prismatic subassembly or rounded subassembly with a liquid electrolyte for a method of preparing a prismatic cell of this invention: (a) by immersion of the subassembly in electrolyte; and (b) by vacuum backfill procedure.
Figure 8B:
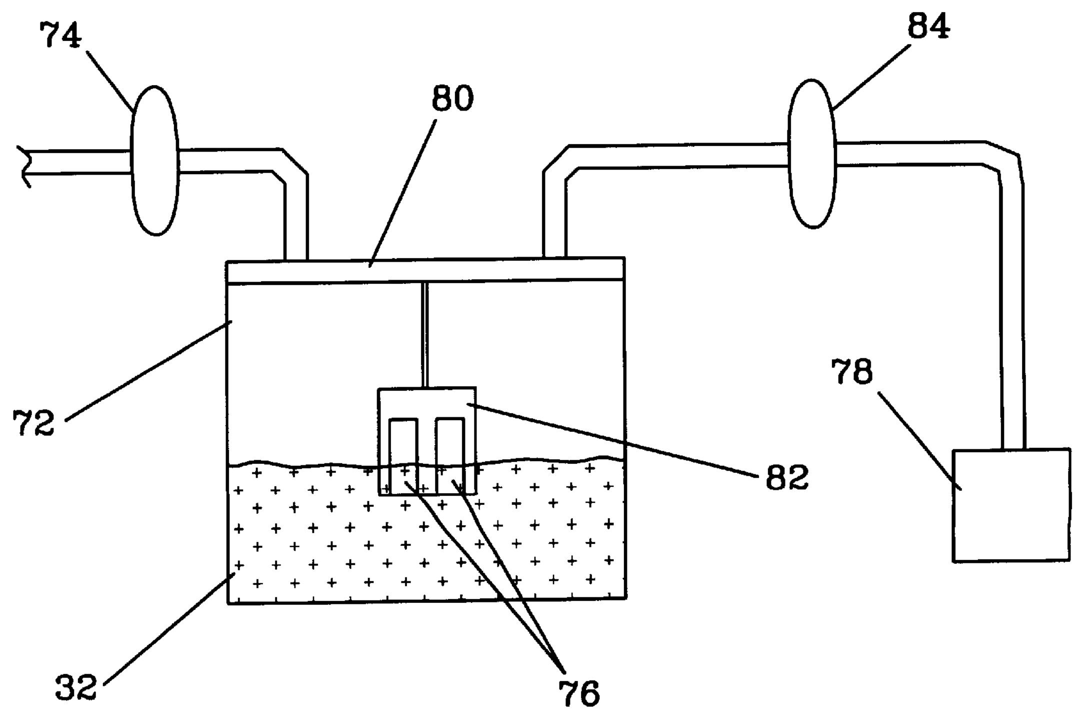

FIG. 8(*a*) illustrates one aspect of the methods of contacting a prismatic subassembly or a rounded subassembly with liquid electrolyte in the methods of the present invention. The contacting step is done by placing the liquid nonaqueous lithium salt electrolyte 32 in the desired amount into the container 72, which may be sealed to the outside air by securing a lid 80 to the top of the container 72, and then the prismatic subassembly or the rounded subassembly 76 is contacted to the liquid electrolyte 32. The contacting or filling step may be performed under atmospheric pressure, elevated pressures, or vacuum conditions. This contacting step may be a total immersion, as illustrated in FIG. 8(*a*); may be a partial immersion; or may involve only contact of an edge of the prismatic subassembly or the rounded subassembly to the surface of the liquid electrolyte. A wide variety of fixtures may be utilized to hold the prismatic subassembly or the rounded subassembly 76 while it is in contact with the liquid electrolyte 74. For example, in FIG. 8(*a*), the fixture 82 holds the prismatic subassembly or rounded subassembly 76 and is also attached to and suspended from the lid 80. After contacting the prismatic subassembly or the rounded subassembly 76 to the liquid electrolyte 32, the lid 80 is tightened on the container 72 to prevent vapors of the liquid electrolyte 32 from escaping from the container 72 and also to prevent outside air and contaminants, such as water, from entering the container 72. Under these contacting conditions, the contacting of the prismatic subassembly or the rounded subassembly with the liquid electrolyte is continued for a total time period as discussed below.

In another embodiment, the contacting step is performed utilizing a vacuum backfill procedure as illustrated in FIG. 8(*b*). The prismatic subassembly or the rounded subassembly 76 is placed in the fixture 82 and placed in the container 72, the lid 80 is attached and sealed. A vacuum is then pulled on the container 72 utilizing conventional vacuum equipment such as a vacuum pump 78. When the desired level of vacuum is reached, the vacuum equipment can be isolated from the inside of the container 72, for example, by turning a valve 84. After evacuation to remove air from the container and from the cell stacks, electrolyte is introduced into the container by opening the valve 84 to allow electrolyte to be pulled into the container from a reservoir. As illustrated in FIG. 8(*b*) the contacting step the may be performed by a partial immersion of the prismatic subassembly or the rounded subassembly 76 in the liquid electrolyte. Under these vacuum backfill conditions, the contacting of the prismatic subassembly or the rounded subassembly with the liquid electrolyte is continued for a total time period. Typically, the time period is chosen to provide the desired level of filling of porous areas of the separator and cathode active layer in the prismatic subassembly or the rounded subassembly 76 on a consistent basis. The desired level of filling is preferably a substantially complete filling of these porous areas in the prismatic subassembly or the rounded subassembly 76. Once porous areas of the prismatic subassembly or the rounded subassembly are substantially filled, longer periods of time of immersion in the vacuum backfill procedure typically do not provide any significant change to the level of filling and have the disadvantage of reducing the productivity of the contacting step.

Since the methods of preparing a prismatic cell of this invention are directed at a wide variety of types of prismatic cells, including those with cathodes with low porosities that are difficult to fill, and those with non-permeable cathode current collectors and non-permeable anodes which limit the avenues through which the liquid electrolyte can fill the prismatic subassembly, the total time period for contacting of the prismatic subassembly to obtain substantially complete filling by the liquid electrolyte may vary widely and may be an extended period of time, for example, 50 hours, in cases where the filling is difficult because of slow penetration of the liquid electrolyte into low porosity areas of the prismatic subassembly, such as the cathode active layer. In one embodiment, the total time period for the contacting of the prismatic subassembly to the liquid electrolyte is in the range of 0.01 to 50 hours. In a preferred embodiment, the total time period for the contacting of the prismatic subassembly to the liquid electrolyte is in the range of 0.02 to 25 hours, and, more preferably, in the range of 0.02 to 2 hours. The contacting step in the methods of preparing a prismatic cell of the present invention is complete when the liquid electrolyte substantially fills porous areas in the prismatic subassembly to provide a prismatic cell stack having two substantially parallel surfaces and internal porous areas substantially filled with liquid electrolyte. Similarly when utilizing the vacuum backfill method, times for evacuation may vary. Typically evacuation times will be in the range of 0.1 and 1 hour, although correspondly longer evacuation times may be needed for larger cells or for the batch processing of cells. The evacuation time may also be dependent on factor such as the vacuum desired, the size of the container holding the subassemblies and the size of the vacuum pump.

As illustrated in FIGS. 8(*a*) and (*b*), the prismatic subassembly or the rounded subassembly 76 may be placed in a fixture to maintain the two substantially parallel flat surfaces during the contacting step. Besides being a convenient method to hold the prismatic subassembly or the rounded subassembly 76 in the liquid electrolyte 32, the fixture may be useful in preventing the prismatic subassembly from changing its dimensions, such as, for example, expanding or swelling and thus losing its substantially parallel flat surfaces during the contacting step. A fixture utilized in the contacting step may contain a single prismatic or rounded subassembly, or multiple prismatic or rounded subassemblies for batch processing. The fixture may take a wide variety of forms, such as, for example, a tray which holds one or more subassemblies, a clamp, and a cage or basket which holds one or more subassemblies. As an alternative to a fixture or in addition to a fixture, a strip of material may be wound around a circumference of a prismatic subassembly to maintain the two substantially parallel flat surfaces during the contacting step. This strip of material may be temporary and may be removed prior to enclosing the prismatic cell stack in the barrier material film or may be retained and become a permanent part of the prismatic cell.

Methods of Enclosing and Sealing the Prismatic Cell Stack

For the methods comprising a winding-pressing-filling-sealing sequence of the present invention, as illustrated in FIG. 2, subsequent to the contacting step 112 and the cell stack removal step 114, the prismatic cell stack 15 is enclosed in a barrier material film 38 prior to a sealing step 118. Subsequent to the removal step 114 and prior to the enclosing step 116, excess liquid electrolyte on the outer surfaces of the prismatic cell stack 15 may be substantially removed, such as, for example, by a process of wiping the outer surfaces with an absorbent cloth or similar material.

Similarly, in the alternative winding-filling-pressing-sealing sequence of the methods of this invention, as illustrated in FIG. 3, subsequent to the cell stack removal step 115, the prismatic cell stack 15 is enclosed in a barrier material film 38 prior to a sealing step 118. Subsequent to the removal step 115 and prior to the enclosing step 116, excess liquid electrolyte on the outer surfaces of the prismatic cell stack 15 may be substantially removed, such as, for example, by a process of wiping the outer surfaces with an absorbent cloth or similar material.

The barrier film in the sealing step, as utilized in the methods of the present invention, may be a single sheet of a film, as illustrated in FIGS. 2 and 3; may comprise multiple sheets of various films as, for example, described in U.S. Pat. No. 4,997,732 to Austin et al.; may be flexible; and may be rigid, as, for example, described in U.S. Pat. No. 5,439,760 to Howard et al. Examples of suitable barrier material films include, but are not limited to, metal films, plastic-metal composite films, plastic films, and rigid metal sheeting. Any of the conventional methods know in the art for fastening barrier material films, such as heat sealing or welding, may be utilized to seal the edges of the barrier material film 38 in the sealing step 118 of the methods of the present invention, as illustrated in FIGS. 2 and 3. The resulting sealed edges of the casing 12 of the prismatic cell 14 may be trimmed back to reduce the outer dimensions of the prismatic cell as long as an adequate seal is retained around the periphery of the sealed edge.

Method of Preshaping and Prefolding the Rounded Subassembly

In the methods of a winding-pressing-filling-sealing sequence of preparing a prismatic cell of the present invention, the rounded subassembly 26 may optionally be preshaped to a form that is intermediate between the rounded shape resulting from step 106 and the prismatic shape having two substantially parallel flat surfaces, including optionally being prefolded on an edge, prior to the compressing step 108 which compresses it into a prismatic subassembly 30. Similarly, in the methods of a winding-filling-pressing-sealing sequence of this invention, the rounded subassembly 26 may optionally be preshaped, including optionally being prefolded on an edge, prior to the contacting step 109 to a source of liquid electrolyte or, alternatively, subsequent to the contacting step 109 and prior to the compressing step 113 which compresses it into a prismatic cell stack 15. This preshaping and prefolding may have utility in improving the effectiveness and consistency of the compressing step by shaping the rounded subassembly or the rounded cell stack into a form intermediate between the original rounded shape from the winding step and the prismatic shape having two substantially parallel flat sides after the compressing step.

This optional preshaping and prefolding step may be done into a wide variety of intermediate forms. One general type of preshaping is formed from a rounded subassembly having a circular cross-section. The preshaped subassembly may still have a rounded shape, such as, for example, an elliptical shape, or it may be partially rounded and partially flat around its circumference. The preshaping and prefolding may be done by a variety of methods, such as, for example, manually, in a press, or in a mold. The preshaped subassembly or, alternatively, the preshaped cell stack when the preshaping is done subsequent to the contacting step on the rounded subassembly, may have one prefolded edge, or it may have two prefolded edges. The prefolded edges correspond to the desired edges or sides of the prismatic subassembly or the prismatic cell stack subsequent to the compressing step and may assist in obtaining consistent compression to the desired prismatic shape in the compressing step.

Anodes

A wide variety of anodes comprising an anode active layer comprising lithium may be utilized in the methods of this invention. Suitable anode active materials comprising lithium for the anodes of the method of the present invention include, but are not limited to, lithium metal, lithium-aluminum alloys, lithium-tin alloys, lithium-intercalated carbons, lithium-intercalated graphites, lithium doped polyacetylenes, lithium doped polyphenylenes, lithium doped polypyrroles, and the like. Preferred anode active materials for the anodes of the method of this invention are lithium metal, lithium-intercalated carbons, and lithium-intercalated graphites.

Anode active materials, such as a lithium metal foil, may be sufficiently electrically conductive to act as the anode current collector or, alternatively, a non-permeable current collector may utilized in the anode. The non-permeable current collector of the anode comprises a conductive layer in contact with the anode active layer of the anode. Suitable conductive layers include, but are not limited to, conductive metals, coatings comprising conductive metal pigments, coatings comprising conductive carbons, coatings comprising conductive graphites, and coatings comprising conductive metal oxide pigments. A preferred conductive layer is copper.

Figure 9:
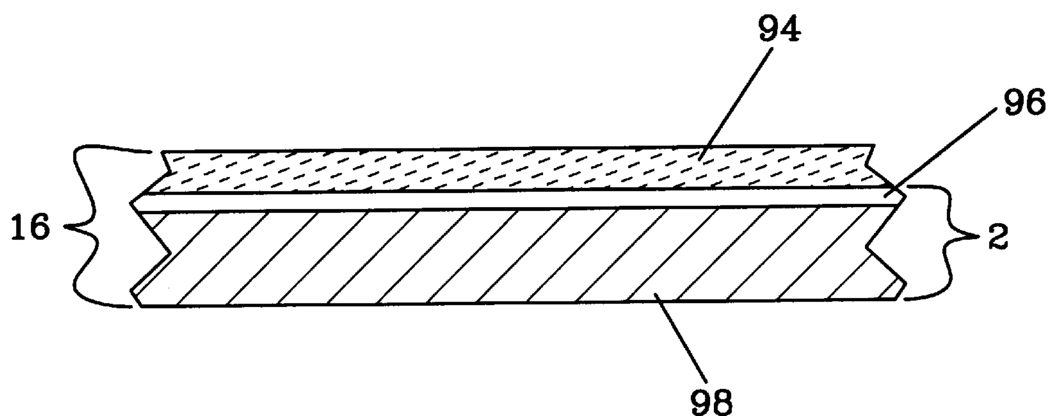
FIG. 9 shows a cross-section of an anode comprising a lithium metal layer, a conductive layer, and an insulating layer of one embodiment of the method of preparing a prismatic cell of the present invention

In one embodiment, the conductive layer of the non-permeable anode current collector is in contact with an insulating layer on the side opposite to the anode active layer comprising lithium. As illustrated in FIG. 9 for an anode 16 comprising a lithium metal anode active layer 94, the non-permeable anode current collector 2 includes a conductive layer 96 in contact with the lithium metal 94 and an insulating layer 98 on the side of the conductive layer 96 opposite to the lithium metal 94. Suitable insulating layers for the non-permeable anode current collector include, but are not limited to, plastic films, such as, polyethylene terephthalate films, polyethylene naphthalate films, and polyimide films; and polymeric coatings such as ethylene-propylene polymer coatings.

As described previously, the anodes may be single sided with an anode active layer on one side of a non-permeable current collector or they may be double side, as for example with an anode active layer on both sides of a non-permeable current collect or a lithium metal foil.

Solid Composite Cathodes

The solid composite cathodes of the methods of preparing a prismatic cell of the present invention comprise a cathode active layer with a cathode active material, having a first surface and a second opposite surface, and a non-permeable current collector on the first surface of the cathode active layer. Suitable non-permeable current collectors include, but are not limited to, conductive metal foils and conductive metal layers on an insulating layer. A conductive pigment layer may optionally be interposed between the cathode active layer with the cathode active material and the metal conductive layer of the non-permeable current collector. Suitable conductive pigment layers include, but are not limited to, coatings comprising conductive metal pigments, coatings comprising conductive carbons, coatings comprising conductive graphites, and coatings comprising conductive metal oxide pigments. In a preferred embodiment, the conductive metal of the non-permeable current collector is aluminum, an insulating layer is present under the aluminum, and the insulating layer is selected from the group consisting of: plastic films, such as, for example, polyethylene terephthalate films; and polymeric coatings, such as, for example, isocyanate-crosslinked urethane coatings.

Figure 10:
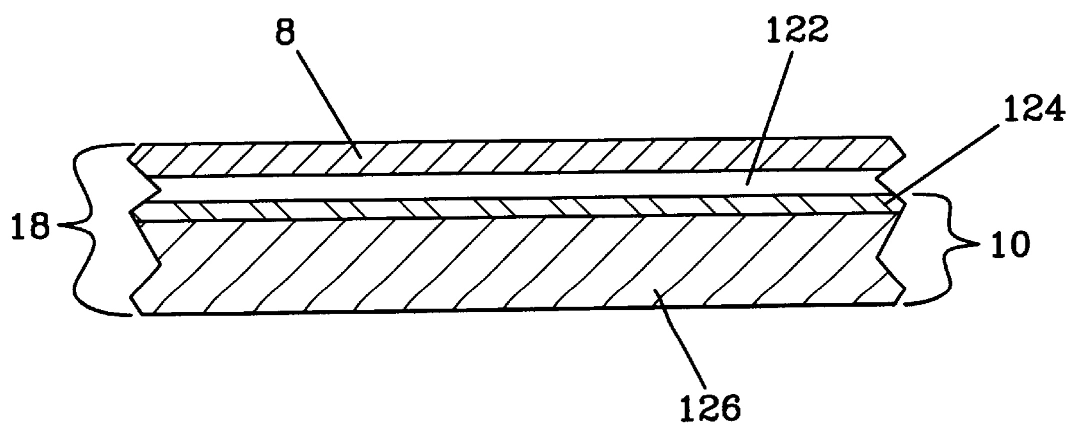
FIG. 10 shows a cross-section of a cathode comprising a cathode active layer, a conductive pigment layer, a conductive metal layer, and an insulating layer of one embodiment of the method of preparing a prismatic cell of the present invention.

FIG. 10 illustrates one aspect of the solid composite cathodes of the methods of preparing a prismatic cell of this invention where the non-permeable current collector 10 is a conductive metal layer 124 on an insulating layer 126 and a conductive pigment layer 122 is interposed between the cathode active layer with the cathode active material and the non-permeable current collector. The cross-section of solid composite cathode 18 in FIG. 10 has successive layers of cathode active layer 8, conductive pigment layer 122, conductive metal layer 124, and insulating layer 126. When this solid composite cathode is utilized in the methods of preparing a prismatic cell of this invention, the cathode active layer is in a face-to-face relationship during the winding step with the anode active layer comprising lithium of the anode and the separator is interposed between this cathode active layer and the anode active layer.

As described above, cathodes may be single sided with a cathode active layer on one side of a non-permeable current collector or they may be double side, as for example with a cathode active layer on both sides of a non-permeable current collect.

The cathode active layer in the solid composite cathode of the methods of preparing prismatic cells of the present invention may comprise a variety of electroactive cathode active materials as well as other optional non-electroactive materials such as, for example, polymeric binders, conductive additives, electrolytes, and other additives to further improve the mechanical integrity and the electrochemical recyclability and capacity utilization of the cells, as is known in the art of fabricating cathodes for electric current producing cells. The term, "electroactive," as used herein, pertains to the electrochemical property of a material which takes part in the electrochemical reaction of charge or discharge in an electric current producing cell. The term, "non-electroactive," as used herein, pertains to the electrochemical property of a material which does not take part in the electrochemical reaction of charge or discharge in an electric current producing cell.

Suitable cathode electroactive materials include, but are not limited to, lithiated transition metal chalcogenides, such as, for example, the electroactive oxides, sulfides, and selenides of transition metals, for example, manganese oxides, titanium sulfides, and vanadium oxides; electroactive conductive polymer, such as, for example, polypyrroles, polyphenylenes, polythiophenes, and polyacetylenes; and, sulfur-containing cathode active materials. Unlike the lithiated transition metal chalcogenides which undergo a lithium intercalation process and a change in the valence state of the metal during the electrochemical reaction of the cell, electroactive sulfur-containing cathode active materials undergo oxidation-reduction, or redox, electrochemical reactions during the operation of the cell by the breaking or forming of sulfur-sulfur covalent bonds. The methods of the present invention are particularly adapted for use with elemental sulfur and other sulfur-containing cathode active materials because it is typically more difficult to effectively fill a prismatic cell that comprises highly insulative sulfur-containing cathode active materials with electrolyte and obtain a high utilization during cycling of the cell. Lithiated transition metal chalcogenides typically are more easily filled due to their naturally porous nature, less complex in their electrochemistry and their capability to be efficiently utilized, and often have some electrical conductivity to assist in obtaining high utilization. The term, "sulfur-containing cathode active material," as used herein, relates to cathode active materials which comprise the element sulfur in any form, wherein the electrochemical activity involves the breaking or forming of sulfur-sulfur covalent bonds.

In one embodiment, the electroactive sulfur-containing cathode active material comprises elemental sulfur.

In one embodiment, the electroactive sulfur-containing cathode active material is organic, that is, it comprises both sulfur atoms and carbon atoms.

In one embodiment, the electroactive sulfur-containing cathode active material is polymeric. In one embodiment, the sulfur-containing cathode active material comprises a sulfur-containing polymer comprising a polysulfide moiety, $S_m$, selected from the group consisting of covalent -$S_m$- moieties, ionic -$S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 8. In one embodiment, the polysulfide moiety, $S_m$, is covalently bonded by one or both of its terminal sulfur atoms on a side group to the polymer backbone chain of the sulfur-containing polymer. In one embodiment, the polysulfide moiety, $S_m$, comprises a covalent -$S_m$- moiety, which covalent -$S_m$- moiety is incorporated by covalent bonds to both of its terminal sulfur atoms into the polymer backbone chain of the sulfur-containing polymer.

The nature of the electroactive sulfur-containing cathode active materials useful in the practice of this invention may vary widely. The electroactive properties of elemental sulfur and of sulfur-containing materials are well known in the art, and include the reversible formation of lithiated or lithium ion sulfides during the discharge or cathode reduction cycle of the battery cell.

Examples of electroactive sulfur-containing polymers include, but are not limited to, those comprising one or more carbon-sulfur polymers of general formulae $(CS_x)_n$ and $(C_2S_z)_n$. Compositions comprising the general formula $—(CS_x)_n—$ (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al. Additional examples of electroactive sulfur-containing polymers include those compositions comprising the general formula $—(C_2S_z)_n—$ (formula II) wherein z ranges from greater than 1 to about 100, and n is equal to or greater than 2, as described in U.S. Pat. No. 5,529,860 and copending U.S. patent application Ser. No. 08/602,323 to Skotheim et al. of the common assignee.

The preferred materials of general formulae I and II, in their oxidized state, comprise a polysulfide moiety of the formula, -$S_m$-, wherein m is an integer equal to or greater than 3, or more preferably, wherein m is an integer from 3 to 10. In one embodiment, m is an integer from 3 to 6. In one embodiment, m is an integer from 3 to 8. In one embodiment, m is an integer from 6 to 10. In one embodiment, m is an integer from 8 to 10. In one embodiment, the polysulfide linkage comprises -S-S-S- (i.e., trisulfide). In one embodiment, the polysulfide linkage comprises -S-S-S-S- (ie., tetrasulfide). In one embodiment, the polysulfide linkage comprises -S-S-S-S-S- (i.e., pentasulfide). In one embodiment, the polysulfide linkage comprises -S-S-S-S-S-S- (i.e., hexasulfide). In one embodiment, the polysulfide linkage comprises -S-S-S-S-S-S-S- (ie., heptasulfide). In one embodiment, the polysulfide linkage comprises -S-S-S-S-S-S-S-S- (ie., octasulfide).

The backbone of electroactive sulfur-containing polymers may comprise polysulfide -$S_m$- main chain linkages as well as covalently bound -$S_m$- side groups. Owing to the presence of multiple linked sulfur atoms, -$S_m$-, where m is an integer equal to or greater than 3, in these materials, they possess significantly higher energy densities than corresponding materials containing the disulfide linkage, -S-S-, alone.

Other preferred electroactive sulfur-containing polymers are those comprising carbocyclic repeat groups, as described in copending U.S. patent application Ser. No. 08/995,112, titled "Electroactive, Energy-Storing, Highly-Crosslinked, Polysulfide-Containing Organic Polymers for Use in Electrochemical Cells," to Gorkovenko et al. of the common assignee.

Other examples of electroactive sulfur-containing polymers comprising a polysulfide moiety, $S_m$, where m is an integer that is equal to or greater than 3, are those containing electron conducting polymers and at least one polysulfurated chain forming a complex with the polymer, as described in U.S. Pat. No. 4,664,991 to Perichaud et al.

Other examples of electroactive sulfur-containing polymers include organo-sulfur materials comprising disulfide linkages, although their low specific capacity compared to the corresponding materials containing polysulfide linkages makes it highly difficult to achieve the desired high capacities in electric current producing cells. However, they may also be utilized in a blend in the cathode active layer with elemental sulfur and/or with sulfur-containing polymers comprising a polysulfide moiety in the solid composite cathodes of this invention and contribute by their electrochemical properties, their known interaction with lithium polysulfides and lithium sulfides generated during the cycling of the cells, and, optionally, their melting properties, to achieving the desired high capacities in the electric current producing cells of the present invention. Examples of these electroactive sulfur-containing materials comprising disulfide groups include those described in U.S. Pat. No. 4,739,018 to Armand et al.; U.S. Pat. Nos. 4,833,048 and 4,917,974, both to DeJonghe et al.; U.S. Pat. Nos. 5,162,175 and 5,516,598, both to Visco et al.; and U.S. Pat. No. 5,324,599 to Oyama et al.

Other suitable examples of electroactive sulfur-containing cathode active materials include materials of general formula, $C_vS$, wherein v is a numerical value within the range of about 4 to about 50, as described in U.S. Pat. No. 4,143,214 to Chang et al. Other examples of electroactive sulfur-containing polymers are those which contain one or more polymer compounds having a plurality of carbon monosulfide units that may generally be written as $(CS)_w$, wherein w is an integer of at least 5, as described in U.S. Pat. No. 4,152,491 to Chang et al.

The relative amounts of electroactive cathode active material, such as sulfur containing cathode active material, and other components such as conductive additives, polymeric binders, electrolytes, other additives, and current collector in the solid composite cathode may vary widely. Generally these relative amounts are determined by experimentation and chosen so as to optimize the amount of electroactive cathode active material present, the energy storage capacity of the cathode, and the electrochemical performance of the cathode in an electric current producing cell. Typically, the amount of sulfur-containing cathode active material used in the cathode active layer will vary from about 50 weight per cent to 96 weight per cent.

In addition to the weight per cent of electroactive cathode active material present in the cathode active layer, the porosity of the cathode active layer is also important in determining the energy storage capacity and the electrochemical utilization of the cathode active material in an electric current producing cell. It is desirable to have the porosity or void areas in the cathode active layer as low as possible, and hence, the density or amount of cathode active material as high as possible, to achieve the highest gravimetric and volumetric specific capacities possible for the cell. However, there is a tradeoff in that very low porosity, such as, for example, less than 40 per cent, in the cathode active layer makes it more difficult to fill efficiently with electrolyte during the preparation of the cell, particularly in a prismatic cell format, and thus makes it more difficult to achieve a high utilization of the cathode active material, such as specific capacities of greater than 700 mAh/g for elemental sulfur and polymers with polysulfide groups, in initial and continued discharge-charge cycling of the cell.

The methods of preparing a prismatic cell of the present invention are advantageous in providing an efficient filling process for the prismatic cell which substantially fills the porous areas of the separator and the cathode active layer without the detrimental effect of significant amounts of excess electrolyte outside the separator and cathode active layers. It is particularly advantageous when the electrolyte has desirable properties for cycle life, capacity, safety, charge rate, self discharge, and other features of the cell, but the electrolyte is difficult to fill due to some physical property, such as viscosity or surface tension, as, for example, with a liquid electrolyte of medium to high viscosity.

In one embodiment, the cathode active layer of the methods of preparing prismatic cells of the present invention comprises greater than 50 per cent by weight of a sulfur-containing cathode active material and further comprises a porosity in the range of 20 per cent to 75 per cent. The percentage porosity of the cathode active layer may be calculated by the following formula:

$$\text{Porosity (\%)} = 100\left(1 - \frac{\text{Apparent Density}}{\text{Materials Composite Density}}\right)$$

where the Apparent Density is the actual density of the cathode active layer in $g/cm^3$ as determined by weighing a known area of the cathode active layer in $g/cm^2$ and then dividing by the average thickness of the cathode active layer in cm in the known area; and the Materials Composite Density is calculated by assuming zero porosity and adding the sum of the actual weight per cent of each material in the cathode active layer multiplied by its specific gravity in $g/cm^3$, and dividing by 100.

Separators

In the methods of the present invention, a separator is interposed between the anode and the cathode. A wide variety of porous materials have been utilized as separators in electric current producing cells and are suitable for use in the methods of this invention. Suitable porous separator materials include, but are not limited to, polyolefins such as polyethylenes and polypropylenes, glass fiber filter papers, ceramic materials, and fluorinated polymers. Another suitable porous separator material is a separator comprising a microporous pseudo-boehmite layer, as described in U.S. patent application Ser. No. 08/995,089, titled "Separators for Electrochemical Cells," by Carlson et al. of the common assignee and in copending applications "Separators for Electrochemical Cells" and "Protective Coating for Separators for Electrochemical Cells," both filed on even day herewith of the common assignee.

In addition to being porous, the separator should be chemically stable to the other materials of the electric current producing cell; flexible; thin; economical in cost; and mechanically strong. These properties are particularly important when the cell is wound and then folded to form a prismatic cell. Typically, free standing separators, such as the porous polyolefin separators, have been 25 microns or greater in thickness. As batteries have continued to evolve to higher volumetric capacities and smaller lightweight structures, there is a need for separators that are 15 microns or less in thickness. Reducing the separator thickness from 25 microns to 15 microns or less greatly increases the difficulty of providing porosity or pore volume for the filling of the pores by electrolyte while simultaneously maintaining good mechanical strength, particularly during the mechanical stresses typically encountered in fabricating a multilayer prismatic cell. The methods of the present invention are particularly advantageous in providing a combination of winding on a relatively large diameter rounded mandrel to minimize mechanical stresses during winding and pressing together with an efficient electrolyte filling process on the prismatic cell stack before the casing is enclosed around the multilayer cell stack. This is particularly useful for prismatic cells comprising non-permeable current collector layers in the anode and the cathode, low porosity cathode active layers, and thin separator layers (15 microns and less) that provide much less total pore volume to the prismatic cell than when thick separator layers (25 microns and greater) are utilized.

Examples of suitable polyolefin separators in the methods of the present invention include, but are not limited to, CELGARD 2500 polyethylene separator film, a trademark for a porous 25 micron thick polyethylene film available from Hoechst Celanese Corporation, Charlotte, N.C.; and E25 SETELA, a tradename for a porous 25 micron thick polyolefin separator available from Tonen Chemical Corporation, Tokyo, Japan, and also available from Mobil Chemical Company, Films Division, Pittsford, N.Y.

As the separator layers become thinner, particularly with a microporous pseudo-boehmite layer which is typically more sensitive to cracking under mechanical stresses than a polyolefin layer, they become more susceptible to developing tears, cracks, and pinholes during the process of preparing the multilayer prismatic cell. This tendency is typically increased when the separator is coated on the cathode prior to the winding step in comparison to the use of a free standing separator film to be wound together with the anode and the cathode. With the coated separators on the surface of the cathode active layer, the anode and cathode in the methods of this invention are still wound in a face-to-face relationship with the separator interposed between the lithium metal and the cathode active layer. However, optionally, an additional separator in the form of a free standing separator film may also be present between the anode and cathode layers during the winding step when the cathode comprises a coated separator layer. One reason that the tendency for damage to the separator layer is typically increased when it is coated on the cathode active layer is that the cathode active and the separator layers are combined essentially into one composite layer, and mechanical failures and stresses in the cathode may propagate into the separator layer. Thus, the methods of the present invention with its reduced mechanical stresses during fabrication of the prismatic cell together with its electrolyte filling efficiency with thin porous separators are advantageous in permitting thin separators, including those such as separators comprising a microporous pseudo-boehmite layer that have a typically reduced mechanical strength and flexibility, to be utilized in preparing multilayer prismatic cells.

Electrolytes

As the electrolyte in the pores of the separator and the cathode active layer in the methods of the present invention, a wide variety of electrolytes may be utilized including, but not limited to, organic electrolytes comprising one or more materials selected from the group consisting of: liquid electrolytes, gel polymer electrolytes, and solid polymer electrolytes. In one embodiment, the electrolyte is a solid polymer electrolyte comprising an ionically conductive polymer and an ionic lithium salt, and optionally an organic solvent. In one embodiment, the electrolyte is a gel polymer electrolyte comprising an ionically conductive polymer, an ionic lithium salt, and an organic solvent, as, for example, an ionic conductive gel electrolyte in the pores of a microporous polyolefin membrane as described in U.S. Pat. Nos. 5,597,659 and 5,691,005 to Morigaki et al. In a preferred embodiment, the electrolyte is a liquid organic electrolyte comprising an ionic lithium salt and an organic solvent. The methods of the present invention are particularly advantageous in providing an efficient filling into the pores of the separator and into the porous areas of the cathode active layer by a moderate to high viscosity electrolyte. This is difficult to achieve when the electrolyte is introduced into the prismatic cell after it has been enclosed by the casing and sealed except for a small opening through which to introduce the electrolyte. Besides giving typically poor filling of the pores in the separator and the cathode active layer, filling into a casing containing the cell stack also may result in excessive amounts of electrolyte in the prismatic cell, including substantial amounts which are outside the cell stack and not effectively utilized in the electrochemical reactions of the cell. In the case of gel polymer or solid polymer electrolytes, the polymer component of these electrolytes may be part of the separator layer, and subsequently the liquid component of the electrolyte comprising an electrolyte solvent and lithium salt is added in the electrolyte filling step.

Examples of suitable liquid electrolytes in the methods of the present invention include, but are not limited to, those comprising an ionic lithium salt and one or more electrolyte solvents selected from the group consisting of: aliphatic ethers, cyclic ethers, glymes, dioxolanes, sulfolanes, N-alkylpyrrolidones, carbonates, sulfones, siloxanes, acetonitrile, N-methyl acetamide, substituted forms of the foregoing, and blends thereof.

Examples of suitable gel polymer electrolytes in the methods of the present invention include, but are not limited to, those comprising, an ionic lithium salt, one or more electrolyte solvents in sufficient quantity to provide the desired semi-solid or gel state, and one or more ionically conductive polymers selected from the group consisting of: polyethylene oxides (PEO), polypropylene oxides, polyacrylonitriles, polysiloxanes, polyphosphazenes, polyimides, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Examples of suitable solid polymer electrolytes useful in the present invention include, but are not limited to, those comprising an ionic lithium salt and one or more ionically conductive polymers selected from the group consisting of: polyethers, polyethylene oxides (PEO), polypropylene oxides, polyimides, polyphosphazenes, polyacrylonitriles (PAN), polysiloxanes, polyether grafted polysiloxanes, derivatives of the foregoing, copolymers of the foregoing, crosslinked and network structures of the foregoing, and blends of the foregoing. The solid polymer electrolytes of this invention may optionally further comprise one or more electrolyte solvents, typically less than 20% by weight.

Examples of suitable ionic lithium salts for use in the electrolytes in the methods of this invention include, but are not limited to, LiBr, LiI, LiSCN, $LiClO_4$, $LiAsF_6$, $LiSO_3CF_3$, $LiSO_3CH_3$, $LiBF_4$, $LiB(phenyl)_4$, $LiPF_6$, $LiC(SO_2CF_3)_3$, $LiN(SO_2CF_3)_2$,

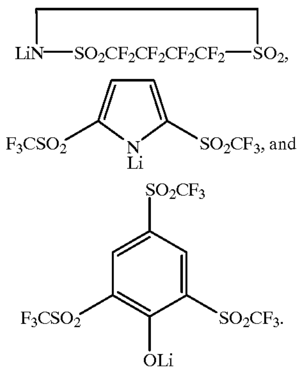

Other ionic lithium salts usefull in the practice of this invention are lithium polysulfides, lithium salts of organic ionic polysulfides and those disclosed in U.S. Pat. No. 5,538,812 to Lee et al. Preferred ionic salts are LiI, LiSCN, $LiSO_3CF_3$ (lithium triflate) and $LiN(SO_2CF_3)_2$ (lithium imide).

Tabs

Tabs are well known in the art of fabricating electric current producing cells, including prismatic cells, for providing the connections between the anode and the cathode to the external circuit for the cell as, for example, described in U.S. Pat. No. 5,439,760 to Howard et al. and U.S. Pat. No. 5,549,717 to Takeuchi et al. For the methods of preparing prismatic cells of the present invention, one or more tabs may be connected to the anode and then fed through the casing of the prismatic cell for connection to the external circuit. For anodes comprising lithium metal, for example lithium foil, of the methods of this invention, the connection of the tab to the anode may be directly to the lithium metal or, alternatively, may be to the current collector of the anode, if one other than the lithium metal is present in the anode. Suitable materials for use in the anode tabs include, but are not limited to, nickel and copper, such as, for example, 0.125 inch thick nickel tabs. These metal tabs to the anode may be attached to the lithium metal of the anode or to the anode current collector if one is present by a variety of conventional methods, such as, for example, by applying pressure.

For the cathodes of the methods of the present invention, the connection of one or more tabs is typically made to the current collector of the cathode. The cathode current collector is either uncoated by the cathode active layer in the area to be tabbed or, if it is overcoated with the cathode active layer and possibly other layers, these layers are removed down to the current collector by a suitable means, such as, for example, by rubbing or scraping the desired area for tabbing, optionally with the aid of a solvent to soften the coating layers to be removed. Suitable materials for use in the cathode tabs include, but are not limited to, aluminum and nickel, silver, tin and stainless steel. Where desired to provide insulative and/or adhesive bonding properties, the cathode tabs may be treated with an insulating and/or an adhesion-promoting coating.

The insertion and attachment of the tabs to the anode and to the cathode may occur at various steps in the methods of the present invention as long as it occurs before the contacting or filling step with the electrolyte. For example, the tabbing steps on the anode and on the cathode may be done prior to the winding step on the large rounded mandrel; may be done subsequent to the winding step, but before the compressing step and/or the filling step, including before or after any preshaping steps to an intermediate form; and may be done after the compressing step, but before contacting to the electrolyte.

The leads of the tabs protrude from the cell stack and extend from the casing after sealing such that the leads may be connected to the external circuit. These leads may be part of the original tabs that were attached to the electrodes or may be conductive extensions that have been attached or added to the original tabs. To prevent any short circuits between the anode and the cathode, the tabs are maintained in an electrically insulated relationship to each other inside the prismatic cell, where the tabs exit the casing of the cell, and externally to the prismatic cell.

Barrier Casing

A wide variety of barrier material films may be utilized in the methods of the present invention. Suitable barrier material films include, but are not limited to, metal films, plastic-metal composite films, plastic films, and rigid metal sheeting. The basic requirement of the barrier material films is that they can be sealed by a suitable process, such as heating, ultrasonic welding or laser welding, to form a sealed casing for the prismatic cell, in which the barrier material film in the sealed casing provides a barrier against the leakage of fluids through the casing. Typically, the barrier material film is provided as two sheets of matched size which are positioned on either side of the cell stack and subsequently sealed on all four edges to form the casing of the prismatic cell.

A partial sealing of the barrier material film on all or part of one edge may be done prior to the contacting or filling of the rounded subassembly or prismatic subassembly with electrolyte, provided that this partial sealing does not interfere with the electrolyte filling process. This may be accomplished, for example, by sealing all or part of one edge on a side of the cell stack where the anode tabs and/or the cathode tabs extend from the cell stack. Partial sealing in this manner provide an attachment of the barrier material film via the tabs to the cell stack, and typically the two separate sheets of barrier material film that are now fastened on one edge to the cell stack may be folded away from the cell stack so as not to interfere with subsequent process steps, such as compressing and electrolyte filling. Finally, after the compressing and filling steps are completed, the barrier material film may be enclosed around the prismatic cell stack and the remaining edges of the barrier material film may then be sealed to provide the casing of the prismatic cell. Regardless of whether there is an initial sealing of the barrier material films on one edge to the tabs or a single sealing step on all four edges of the barrier material films after compressing and filling, the prismatic cell of the methods of the present invention typically has the anode tabs and the cathode tabs extending through the sealed area and thus available for attachment to the external circuit outside of the prismatic cell.

Encapsulation

It may be advantageous in the methods of the present invention to encapsulate the prismatic cell stack after the compressing and filling steps but before the sealing step or, alternatively, to encapsulate the prismatic cell stack to form a casing without the need to enclose it in a barrier material film and then seal to form the casing. The encapsulation in the methods of this invention seals the permeable surfaces on the outside of the prismatic cell stack to help to retain the electrolyte in the cell stack in the pores of the separator and the cathode active layer, to slow down or prevent the undesirable evaporation of electrolyte solvents and any other volatile components from the cell stack, and to protect against water and other undesirable liquids and volatiles from getting into the cell stack. Since the current collector layer of the cathode and anode, if one is present, as well as lithium metal anode active layers, are non-permeable to liquids, the permeable surfaces of the prismatic cell stack are on the edges of the winding where the electrolyte may penetrate in between the layers to fill the porous areas of the separator and the cathode active layer. After encapsulation, these permeable surfaces on the outside of the cell stack are converted into non-permeable surfaces so that no liquid may flow into or out of the cell stack.

A wide variety of encapsulating methods may be utilized in the methods of this invention. For example, the outside permeable surfaces of the prismatic cell stack may be contacted to a liquid comprising an encapsulating resin, subsequently removed from contact to this liquid, and then heated or cooled to form a non-permeable layer of the encapsulating resin over the outside permeable surfaces. An example of a liquid comprising an encapsulating resin suitable for use in the methods of this invention is a solution of polyethylene dissolved in toluene. After contacting with the liquid, removing from the liquid, and then heating to remove the volatile solvent, a non-permeable layer of the polyethylene encapsulating resin forms over the outside permeable surfaces of the cell stack. Another example is a liquid solution of melted polyethylene. After contacting with the liquid, removing from the liquid, and then cooling to solidify the resin, a non-permeable layer of the polyethylene encapsulating resin forms over the outside permeable surfaces of the cell stack. Other suitable encapsulating materials include, but are not limited to, waxes, thermal plastic resins and thermal setting resins, as know in the art of encapsulation of electrical components.

Edge Contacting

As the layers in a multilayer prismatic cell become thinner and the total surface areas of the anode and cathode become larger, it becomes progressively more difficult to achieve efficient collection of the current from the cell using a single tab, or a small number of tabs, from the anode and the cathode to the external circuit. Also, current collection through only a few tabs or a single tab to a lithium metal foil anode in a large surface area prismatic cell, such as, for example, 1000 $cm^2$ of lithium metal foil anode surface in a prismatic cell with external dimensions of 34 mm wide, 70 mm long, and 7 mm thick, may have a shortened cycle life due to severing or loss of lithium metal at the tab connection. This would prevent current collection from any portion of the cell no longer connected electrically to the severed tab connection. Accordingly, it is advantageous to do a continuous edge contacting of the edges of the anode and the cathode in addition to at least one tab to the anode and to the cathode to collect the current from the continuous edge contacting for connection to the external circuit. For example, U.S. Pat. No. 5,415,954 to Gauthier et al. describes continuous edge contacting of the lithium metal for an anode in combination with a polymer electrolyte.

When the anode of the prismatic cells of the methods of the present invention is lithium metal which also acts as the current collector, the edge of the lithium metal anode may be placed in electrical contact by a variety of methods including, but not limited to, ultrasonic welding and metal spraying. In a preferred embodiment, the edge of the lithium metal anode extends beyond the corresponding edges of the solid composite cathode and the separator and substantially all of the lithium metal extensions are placed in electrical contact by ultrasonic welding.

When the anode of the prismatic cells of the methods of this invention comprises an anode active layer comprising lithium and a non-permeable current collector, as described herein, the edge of the conductive layer of the non-permeable current collector of the anode may be placed in electrical contact by a variety of methods including, but not limited to, metal spraying. In one embodiment, the edge of the conductive layer of the non-permeable current collector of the anode provides a plurality of anode contact edges for the multilayer cell; and a metallic layer is deposited in electrical contact with the conductive layers at substantially all of the anode contact edges; and, preferably, the edge of the conductive layer extends beyond the corresponding edges of the solid composite cathode, the separator, and the anode active layer. Suitable metals for the metallic layer include, but are not limited to, copper and nickel. Preferably, the metallic layer is deposited by metal spraying. In a preferred embodiment, the conductive layer of the non-permeable current collector is copper and the insulating layer of the non-permeable current collector of the anode is selected from the group consisting of plastic films and polymeric coatings.

When the solid composite cathode of the prismatic cells of the methods of the present invention comprises a conductive metal foil as the non-permeable current collector, the edge of the cathode may be placed in electrical contact by a variety of methods including, but not limited to, ultrasonic welding and metal spraying. In a preferred embodiment, the edge of the metal foil current collector of the cathode extends beyond the corresponding edges of the cathode active layer, the separator, and the anode, and substantially all of the cathode current collector metal extensions are placed in electrical contact by ultrasonic welding.

When the solid composite cathode of the prismatic cells of the methods of this invention comprises a conductive layer on an insulating layer as the non-permeable current collector, as described herein, the edge of the conductive layer of the non-permeable current collector of the cathode may be placed in electrical contact by a variety of methods including, but not limited to, metal spraying. In one embodiment, the edge of the conductive layer of the non-permeable current collector of the cathode provides a plurality of cathode contact edges for the multilayer cell; and a metallic layer is deposited in electrical contact with the conductive layers at substantially all of the cathode contact edges; and, preferably, the edge of the conductive layer extends beyond the corresponding edges of the cathode active layer, the separator, and the anode. Suitable metals for the metallic layer includes, but is not limited to, aluminum, nickel, silver, tin and stainless steel. Preferably, the metallic layer is deposited by metal spraying.

Dimensional Stability of Cell Stack

To maintain the consistency of performance of the prismatic cells in terms of capacity, cycle life, safety, and other important parameters, it is desirable that the prismatic cell stack substantially retains its physical dimensions after the compressing step. Thus, it is undesirable that the compressed prismatic cell stack spring back or otherwise expand its physical dimensions after the pressing step. This "setting" of the prismatic cell stack may be accomplished by a variety of ways including, but not limited to, selection of materials, such as aluminum conductive foils for the cathode current collector, that "set" and resist springing back after the pressing step; encapsulation of the cell stack, as described herein; sealing the the barrier material films around the cell stack; and combinations thereof.

Another suitable method of maintaining the dimensional stability of the compressed cell stack is to utilize a non-permeable current collector for the anode, which anode current collector comprises an insulating layer under the conductive layer in contact with the lithium metal, and to utilize a non-permeable current collector for the cathode, which cathode current collector comprises a conductive metal layer on an insulating layer; wherein the insulating layer of the anode current collector and the insulating layer of the cathode current collector are in a face-to-face relationship and further are adhered to each other. In one embodiment, the insulating layers in the face-to-face relationship are adhered by the application of heat, preferably applied in either the winding step or in the compressing step. An example of applying heat at the winding step by heating the mandrel is described in U.S. Pat. No. 4,723,347 to Burzi et al. In another embodiment, the insulating layers in the face-to-face relationship are adhered by the application of an adhesive to one or both of the insulating layers prior to the winding step. Preferably the adhesive is non-porous.

What is claimed is:

1. A method of preparing a multilayer electric current producing cell, said cell comprising a casing and a prismatic cell stack, said prismatic cell stack having an external length dimension, an external width dimension, an external thickness dimension, two substantially parallel flat surfaces, and outside permeable surfaces; which method comprises, in order, the steps of:

(a) providing a laminar combination of:

(i) an anode comprising an anode active layer, which layer comprises an anode active material comprising lithium;

(ii) a solid composite cathode comprising a cathode active layer, which layer comprises a cathode active material, said cathode active layer having a first surface and a second opposite surface, said solid composite cathode further comprising a non-permeable current collector in contact with said first surface of said cathode active layer; and, (iii) a separator interposed between said anode and said solid composite cathode, and in contact with said second surface of said cathode active layer;

wherein said anode active layer and said cathode active layer are positioned in a face-to-face relationship;

(b) winding said combination on a mandrel having a cross-section of a rounded shape and having a circumference selected from the lengths consisting of:

(i) 140 to 200 per cent of the difference between said external length dimension and said external thickness dimension of said prismatic cell stack; and, (ii) 140 to 200 per cent of the difference between said external width dimension and said external thickness dimension of said prismatic cell stack;

said winding forming a rounded anode-separator-solid composite cathode subassembly having a jellyroll configuration and a rounded shape;

(c) removing said mandrel from said rounded subassembly;

(d) compressing said rounded subassembly in a press to form a prismatic subassembly having two substantially parallel flat surfaces;

(e) removing said prismatic subassembly from said press;

(f) contacting said prismatic subassembly with a source of a liquid nonaqueous lithium salt electrolyte to form said prismatic cell stack, wherein said electrolyte substantially fills porous areas within said prismatic cell stack;

(g) removing said prismatic cell stack from contact with said source of electrolyte;

(h) enclosing said prismatic cell stack in a barrier material film; and, (i) sealing said film to form said casing.

2. The method of claim 1, wherein, after step (c) and prior to step (d), said rounded subassembly is shaped into a form that is intermediate between said rounded shape resulting from step (c) and a prismatic shape having two substantially parallel flat surfaces.

3. The method of claim 2, wherein said intermediate form comprises a prefolded edge.

4. The method of claim 1, wherein, prior to step (b), one or more anode tabs are attached to said anode and one or more cathode tabs are attached to said current collector of said solid composite cathode.

5. The method of claim 4, wherein, after step (c) and prior to step (d), said rounded subassembly is shaped into a form that is intermediate between said rounded shape resulting from step (c) and a prismatic shape having two substantially parallel flat surfaces.

6. The method of claim 5, wherein said intermediate form comprises a prefolded edge.

7. The method of claim 1, wherein, after step (c) and prior to step (d), one or more anode tabs are attached to said anode and one or more cathode tabs are attached to said current collector of said solid composite cathode.

8. The method of claim 1, wherein, after step (e) and prior to step (f), one or more anode tabs are attached to said anode and one or more cathode tabs are attached to said current collector of said solid composite cathode.

9. The method according to any one of claims 4 to 8, wherein said one or more anode tabs and said one or more cathode tabs extend from said prismatic cell stack and through said casing in an electrically insulated relationship with respect to each other and to said casing.

10. The method of claim 1, wherein, after step (g) and prior to step (h), said outside permeable surfaces of said prismatic cell stack are encapsulated to form a non-permeable prismatic cell stack.

11. The method of claim 10, wherein said outside permeable surfaces are:

(i) immersed in a liquid comprising an encapsulating resin;

(ii) removed from said liquid; and, (iii) heated or cooled to form a non-permeable layer of said encapsulating resin over said outside permeable surfaces of said prismatic cell stack.

12. The method of claim 1, wherein said rounded subassembly has an outermost layer formed by said separator.

13. The method of claim 1, wherein, after step (b) and prior to step (d), said rounded subassembly is wound with a layer of an insulating film, and said film is attached to said rounded subassembly.

14. The method of claim 1, wherein said rounded shape in step (b) is a circle.

15. The method of claim 1, wherein said rounded shape in step (b) is an ellipse.

16. The method of claim 1, wherein said circumference is selected from the lengths consisting of:

(i) 150 to 195 per cent of the difference between said external length dimension and said external thickness dimension of said prismatic cell stack; and, (ii) 150 to 195 per cent of the difference between said external width dimension and said external thickness dimension of said prismatic cell stack.

17. The method of claim 1, wherein said circumference is selected from the lengths consisting of:

(i) 160 to 190 per cent of the difference between said external length dimension and said external thickness dimension of said prismatic cell stack; and, (ii) 160 to 190 per cent of the difference between said external width dimension and said external thickness dimension of said prismatic cell stack.

18. The method of claim 1, wherein said anode active layer is a lithium metal layer.

19. The method of claim 18, wherein, after step (e) and prior to step (f), one or more anode tabs are attached to said lithium metal of said anode active layer and one or more cathode tabs are attached to said current collector of said solid composite cathode.

20. The method of claim 18, wherein an edge of said lithium metal layer extends beyond corresponding edges of said solid composite cathode and said separator to form a lithium metal extension, and wherein substantially all of said lithium metal extensions are placed in electrical contact by ultrasonic welding.

21. The method of claim 1, wherein said anode further comprises a non-permeable current collector.

22. The method of claim 21, wherein, prior to step (b), one or more anode tabs are attached to said non-permeable current collector of said anode and one or more cathode tabs are attached to said current collector of said solid composite cathode.

23. The method of claim 21, wherein said non-permeable current collector of said anode comprises a conductive layer having a first surface and an opposite second surface, said first surface being in contact with said anode active layer, wherein said conductive layer is selected from the group consisting of:

conductive metals, coatings comprising conductive metal pigments, coatings comprising conductive carbons, coatings comprising conductive graphites, and coatings comprising conductive metal oxide pigments.

24. The method of claim 23, wherein said second surface of said conductive layer of said non-permeable current collector of said anode is in contact with an insulating layer.

25. The method of claim 23, wherein an edge of said conductive layer of said non-permeable current collector of said anode provides a plurality of anode contact edges for said multilayer cell; and wherein a metallic layer is deposited in electrical contact with said conductive layers at substantially all of said anode contact edges.

26. The method of claim 25, wherein said edge of said conductive layer of said non-permeable current collector of said anode extends beyond corresponding edges of said solid composite cathode, said separator, and said anode active layer.

27. The method of claim 25, wherein said metallic layer comprises a metal selected from the group of metals consisting of: copper and nickel.

28. The method of claim 25, wherein said metallic layer is deposited by metal spraying.

29. The method of claim 24, wherein said conductive layer of said non-permeable current collector of said anode comprises copper, and said insulating layer of said non-permeable current collector of said anode is selected from the group consisting of: plastic films and polymeric coatings.

30. The method of claim 1, wherein said non-permeable current collector of said solid composite cathode is selected from the group consisting of: conductive metal foils and conductive metal layers on an insulating layer.

31. The method of claim 30, wherein a conductive layer is interposed between said cathode active layer and said non-permeable current collector of said solid composite cathode, which conductive layer is selected from the group consisting of:

coatings comprising conductive metal pigments, coatings comprising conductive carbons, coatings comprising conductive graphites, and coatings comprising conductive metal oxide pigments.

32. The method of claim 30, wherein said conductive metal of said non-permeable current collector of said solid composite cathode comprises aluminum, and said insulating layer of said non-permeable current collector of said solid composite cathode is selected from the group consisting of: plastic films and polymeric coatings.

33. The method of claim 30, wherein an edge of said conductive metal foil of said current collector of said solid composite cathode extends beyond corresponding edges of said anode and said separator to form a conductive metal foil extension, and wherein substantially all of said conductive metal foil extensions are placed in electrical contact by ultrasonic welding.

34. The method of claim 30, wherein an edge of said current collector of said solid composite cathode provides a plurality of cathode contact edges for said multilayer cell; and wherein a metallic layer is deposited in electrical contact with said current collector of said solid composite cathode at substantially all of said cathode contact edges.

35. The method of claim 34, wherein said edge of said current collector of said solid composite cathode extends beyond corresponding edges of said cathode active layer, said separator, and said anode.

36. The method of claim 34, wherein said metallic layer comprises a metal selected from the group consisting of: aluminum, nickel, silver, tin, and stainless steel.

37. The method of claim 34, wherein said metallic layer is deposited by metal spraying.

38. The method of claim 30, wherein said anode further comprises a non-permeable current collector, said current collector of said anode comprising a conductive layer having a first surface and an opposite second surface, said first surface being in contact with said anode active layer;

wherein said second surface of said conductive layer of said non-permeable current collector of said anode is in contact with an insulating layer;

and further wherein said conductive layer of said non-permeable current collector of said anode is selected from the group consisting of:

conductive metals, coatings comprising conductive metal pigments, coatings comprising conductive carbons, coatings comprising conductive graphites, and coatings comprising conductive metal oxide pigments.

39. The method of claim 38, wherein said insulating layer of said current collector of said anode and said insulating layer of said current collector of said solid composite cathode are positioned in a face-to-face relationship.

40. The method of claim 39, wherein said insulating layers positioned in said face-to-face relationship are adhered to each other.

41. The method of claim 40, wherein said insulating layers are adhered to each other by the application of heat.

42. The method of claim 41, wherein said heat is applied during step (b).

43. The method of claim 41, wherein said heat is applied during step (d).

44. The method of claim 40, wherein, prior to step (b), said insulating layers are adhered to each other by application of an adhesive to one or both of said insulating layers.

45. The method of claim 1, wherein said separator is a porous polyolefin separator.

46. The method of claim 1, wherein said separator comprises a microporous pseudo-boehmite layer.

47. The method of claim 1, wherein said separator is coated on said solid composite cathode.

48. The method of claim 47, wherein said separator comprises a microporous pseudo-boehmite layer.

49. The method of claim 1, wherein said press is operated at a pressure in the range of 100 to 6000 kPa to form said prismatic subassembly.

50. The method of claim 1, wherein said press is operated at a pressure in the range of 200 to 5000 kPa to form said prismatic subassembly.

51. The method of claim 1, wherein said press is operated at a pressure in the range of 200 to 3500 kPa to form said prismatic subassembly.

52. The method of claim 1, wherein said press contacts said rounded subassembly via a metal surface.

53. The method of claim 1, wherein said press contacts said rounded subassembly via a rubber surface.

54. The method of claim 1, wherein said contacting of said prismatic subassembly in step (f) is performed utilizing a vacuum backfill procedure comprising the steps of:

(i) placing said prismatic subassembly in a container;

(ii) subjecting said container to a vacuum for a specific time;

(iii) contacting said prismatic subassembly with said electrolyte; and, (iv) continuing contacting of said prismatic subassembly for a total time period.

55. The method of claim 1, wherein, in step (f), said prismatic subassembly is contacted with said electrolyte source for a total time period in the range of 0.01 to 50 hours.

56. The method of claim 1, wherein, in step (f), said prismatic subassembly is contacted with said electrolyte source for a total time period in the range of 0.02 to 25 hours.

57. The method of claim 1, wherein, in step (f), said prismatic subassembly is contacted with said electrolyte source for a total time period in the range of 0.02 to 2 hours.

58. The method of claim 1, wherein, during step (f), said prismatic subassembly is placed in a fixture to maintain said two substantially parallel flat surfaces, and said fixture is removed prior to step (h).

59. The method of claim 1, wherein, during step (f), a strip of material is wound around a circumference of said prismatic subassembly to maintain said two substantially parallel flat surfaces.

60. The method of claim 59, wherein said strip is removed prior to step (h).

61. The method of claim 1, wherein, after step (g) and prior to step (h), excess electrolyte on outside surfaces of said prismatic cell stack is substantially removed.

62. The method of claim 1, wherein said anode active material comprising lithium is selected from the group consisting of:

lithium metal, lithium-aluminum alloys, lithium-tin alloys, lithium-intercalated carbons, lithium-intercalated graphites, lithium doped polyacetylenes, lithium doped polyphenylenes, and lithium doped polypyrroles.

63. The method of claim 1, wherein said cathode active layer comprises greater than 50 per cent by weight of a sulfur-containing cathode active material, and said cathode active layer has a porosity in the range of 20 to 75 per cent by volume.

64. The method of claim 1, wherein said cathode active material in said cathode active layer comprises elemental sulfur.

65. The method of claim 1, wherein said cathode active material in said cathode active layer comprises a sulfur-containing polymer comprising $-S_m-$ moieties, wherein m is an integer equal to or greater than 3.

66. A method of preparing a multilayer electric current producing cell, said cell comprising a casing and a prismatic cell stack, said prismatic cell stack having an external length dimension, an external width dimension, an external thickness dimension, two substantially parallel flat surfaces, and outside permeable surfaces; which method comprises, in order, the steps of:

(a) providing a laminar combination of:

(i) an anode comprising an anode active layer, which layer comprises an anode active material comprising lithium;

(ii) a solid composite cathode comprising a cathode active layer, which layer comprises a cathode active material, said cathode active layer having a first surface and a second opposite surface, said solid composite cathode further comprising a non-permeable current collector in contact with said first surface of said cathode active layer; and, (iii) a separator interposed between said anode and said solid composite cathode, and in contact with said second surface of said cathode active layer, wherein said anode active layer and said cathode active layer are positioned in a face-to-face relationship;

(b) winding said combination on a mandrel having a cross-section of a rounded shape and having a circumference selected from the lengths consisting of:

(i) 140 to 200 per cent of the difference between said external length dimension and said external thickness dimension of said prismatic cell stack; and, (ii) 140 to 200 per cent of the difference between said external width dimension and said external thickness dimension of said prismatic cell stack;

said winding forming a rounded anode-separator-solid composite cathode subassembly having a jellyroll configuration and a rounded shape;

(c) removing said mandrel from said rounded subassembly;

(d) contacting said rounded subassembly with a source of liquid nonaqueous lithium salt electrolyte to form a rounded cell stack, wherein said electrolyte substantially fills porous areas within said rounded cell stack;

(e) compressing said rounded cell stack in a press to form said prismatic cell stack, wherein said electrolyte substantially fills porous areas within said prismatic cell stack;

(f) removing said prismatic cell stack from said press;

(g) enclosing said prismatic cell stack in a barrier material film; and, (h) sealing said film to form said casing.

67. The method of claim 66, wherein after step (c)and prior to step (d) said rounded subassembly is shaped into a form that is intermediate between said rounded shape resulting from step (c) and a prismatic shape having two substantially parallel flat surfaces.

68. The method of claim 66, wherein prior to step (b), one or more anode tabs are attached to said anode and one or more cathode tabs are attached to said current collector of said solid composite cathode.

69. The method of claim 68, wherein said one or more anode tabs and said one or more cathode tabs extend from said prismatic cell stack and through said casing in an electrically insulated relationship with respect to each other and to said casing.

70. The method of claim 69, wherein after step (f) and prior to step (g), said outside permeable surfaces of said prismatic cell stack are encapsulated to form a non-permeable prismatic cell stack.

71. The method of claim 70, wherein said outside permeable surfaces are:

(i) immersed in a liquid comprising an encapsulating resin;

(ii) removed from said liquid; and, (iii) heated or cooled to form a non-permeable layer of said encapsulating resin over said outside permeable surfaces of said prismatic cell stack.

72. The method of claim 66, wherein said anode further comprises a non-permeable current collector.

73. The method of claim 72, wherein prior to step (b), one or more anode tabs are attached to said non-permeable current collector of said anode and one or more cathode tabs are attached to said current collector of said solid composite cathode.

74. The method of claim 72, wherein said non-permeable current collector of said anode comprises a conductive layer having a first surface and an opposite second surface, said first surface being in contact with said anode active layer, wherein said conductive layer is selected from the group consisting of:

conductive metals, coatings comprising conductive metal pigments, coatings comprising conductive carbons, coatings comprising conductive graphites, and coatings comprising conductive metal oxide pigments.

75. The method of claim 74, wherein said second surface of conductive layer is in contact with an insulating layer of said non-permeable current collector of said anode.

76. The method of claim 66, wherein said non-permeable current collector of said solid composite cathode is selected from the group consisting of: conductive metal foils and conductive metal layers on an insulating layer.

77. The method of claim 76, wherein a conductive layer is interposed between said cathode active layer and said non-permeable current collector of said solid composite cathode, which conductive layer is selected from the group consisting of:

coatings comprising conductive metal pigments, coatings comprising conductive carbons, coatings comprising conductive graphites, and coatings comprising conductive metal oxide pigments.

78. The method of claim 76, wherein said conductive metal of said non-permeable current collector of said solid composite cathode comprises aluminum, and said insulating layer of said non-permeable current collector of said solid composite cathode is selected from the group consisting of: plastic films and polymeric coatings.

79. The method of claim 76, wherein said anode further comprises a non-permeable current collector, which non-permeable current collector of said anode comprises a conductive layer having a first surface and an opposite second surface, said first surface being in contact with said anode active layer and said second surface of said conductive layer of said non-permeable current collector of said anode being in contact with an insulating layer; wherein said conductive layer is selected from the group consisting of:

conductive metals, coatings comprising conductive metal pigments, coatings comprising conductive carbons, coatings comprising conductive graphites, and coatings comprising conductive metal oxide pigments.

80. The method of claim 79, wherein said insulating layer of said current collector of said anode and said insulating layer of said current collector of said solid composite cathode are positioned in a face-to-face relationship.

81. The method of claim 80, wherein said insulating layers positioned in said face-to-face relationship are adhered to each other.

82. The method of claim 81, wherein said insulating layers are adhered to each other by application of heat.

83. The method of claim 82, wherein said heat is applied during step (b).

84. The method of claim 80, wherein prior to step (b), said insulating layers are adhered to each other by application of an adhesive to one or both of said insulating layers.

85. The method of claim 66, wherein said separator is a porous polyolefin separator.

86. The method of claim 66, wherein said separator comprises a microporous pseudo-boehmite layer.

87. The method of claim 66, wherein said separator is coated on said solid composite cathode.

88. The method of claim 87, wherein said separator comprises a microporous pseudo-boehmite layer.

89. The method of claim 66, wherein said press is operated at a pressure in the range of 100 to 6000 KPa to form said prismatic cell stack.

90. The method of claim 66, wherein said press is operated at a pressure in the range of 200 to 5000 KPa to form said prismatic cell stack.

91. The method of claim 66, wherein said press is operated at a pressure in the range of 200 to 3500 KPa to form said prismatic cell stack.

92. The method of claim 66, wherein said press contacts said rounded subassembly via a metal.

93. The method of claim 66, wherein said press contacts said rounded subassembly via a rubber material.

94. The method of claim 66, wherein said contacting of said rounded subassembly in step (d) is performed utilizing a vacuum backfill procedure comprising the steps of (i) placing said rounded subassembly in a container; (ii) subjecting said container to a vacuum for a specific time; (iii) contacting said rounded subassembly with said electrolyte and, (iv) continuing contacting of said rounded subassembly for a total time period.

95. The method of claim 66, wherein in step (d) of said rounded subassembly is contacted with said electrolyte source for a total time period in the range of 0.01 to 50 hours.

96. The method of claim 66, wherein in step (d) of said rounded subassembly is contacted with said electrolyte source for a total time period in the range of 0.02 to 25 hours.

97. The method of claim 66, wherein in step (d) of said rounded subassembly is contacted with said electrolyte source for a total time period in the range of 0.02 to 2 hours.

98. The method of claim 66, wherein, after step (f) and prior to step (g), excess electrolyte on outside surfaces of said prismatic cell stack is substantially removed.

99. The method of claim 66, wherein said cathode active layer comprises greater than 50 per cent by weight of a sulfur-containing cathode active material, and said cathode active layer has a porosity in the range of 20 to 75 per cent by volume.

100. The method of claim 66, wherein said cathode active material in said cathode active layer comprises elemental sulfur.

101. The method of claim 66, wherein the cathode active material in said cathode active layer comprises a sulfur-containing polymer comprising -$S_m$- moieties, wherein m is an integer equal to or greater than 3.

102. The method of claim 66, wherein said anode active material comprising lithium is selected from the group consisting of:

lithium metal, lithium-aluminum alloys, lithium-tin alloys, lithium-intercalated carbons, lithium-intercalated graphites, lithium doped polyacetylenes, lithium doped polyphenylenes, and lithium doped polypyrroles.

103. The method of claim 66, wherein said anode active layer is a lithium metal layer.

* * * * *